July 20, 1937. C. E. BEACH Re. 20,449

SIGNAL APPARATUS

Original Filed Nov. 5, 1931 8 Sheets-Sheet 1

INVENTOR

Clarence E. Beach by Roberts, Cushman & Woodbury

ATTORNEY

July 20, 1937. C. E. BEACH Re. 20,449

SIGNAL APPARATUS

Original Filed Nov. 5, 1931 8 Sheets-Sheet 2

INVENTOR

Clarence E. Beach by Roberts, Cushman & Woodberry

ATTORNEY

SIGNAL APPARATUS

Original Filed Nov. 5, 1931 8 Sheets-Sheet 3

INVENTOR
Clarence E. Beach
by Roberts, Cushman & Woodberry
ATTORNEY

July 20, 1937. C. E. BEACH Re. 20,449

SIGNAL APPARATUS

Original Filed Nov. 5, 1931 8 Sheets-Sheet 4

Inventor
Clarence E. Beach
by Roberts, Cushman & Woodbury.
Attys.

July 20, 1937. C. E. BEACH Re. 20,449

SIGNAL APPARATUS

Original Filed Nov. 5, 1931 8 Sheets-Sheet 5

Inventor
Clarence E. Beach
by Roberts, Cushman & Woodbury.
Attys.

July 20, 1937. C. E. BEACH Re. 20,449

SIGNAL APPARATUS

Original Filed Nov. 5, 1931 8 Sheets-Sheet 6

Inventor
Clarence E. Beach
by Roberts, Cushman & Woodbury.
Attys.

July 20, 1937. C. E. BEACH Re. 20,449
SIGNAL APPARATUS
Original Filed Nov. 5, 1931 8 Sheets-Sheet 7
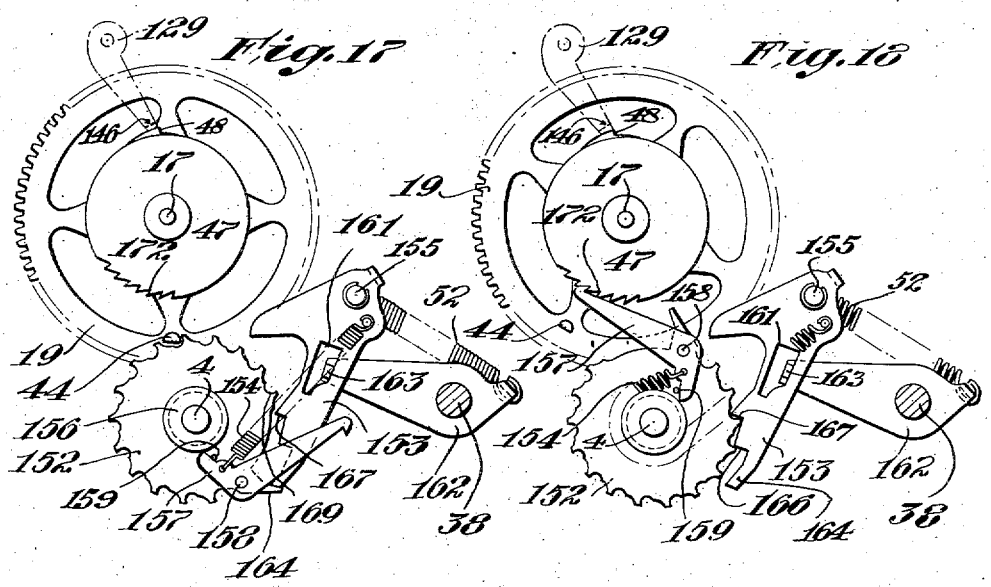
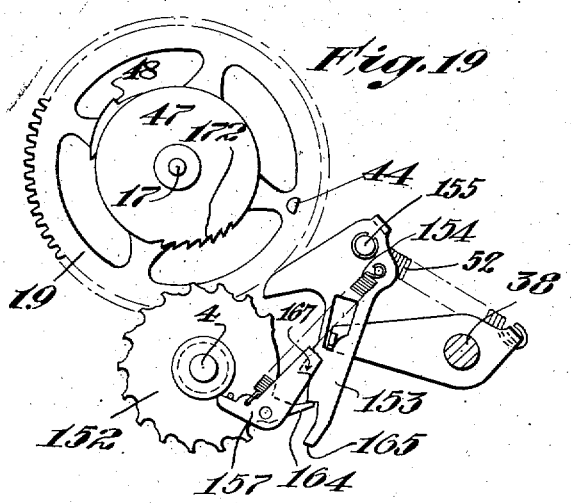
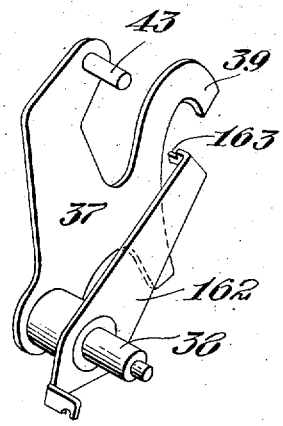
Inventor
Clarence E. Beach
By Roberts, Cushman & Woodberry,
Attys.

July 20, 1937.

C. E. BEACH

Re. 20,449

SIGNAL APPARATUS

Original Filed Nov. 5, 1931 8 Sheets-Sheet 8

Inventor
Clarence E. Beach
by Roberts, Cushman & Woodbury.
Attys.

Reissued July 20, 1937 Re. 20,449

UNITED STATES PATENT OFFICE 20,449

SIGNAL APPARATUS

Clarence E. Beach, Brookline, Mass., assignor to The Gamewell Company, Newton Upper Falls, Mass., a corporation of Massachusetts Original No. 1,999,859, dated April 30, 1935, Serial No. 573,150, November 5, 1931. Application for reissue April 22, 1937, Serial No. 138,480

48 Claims. (Cl. 177—361)

This invention relates to signal formulating or transmitting mechanisms and systems, and more particularly to improvements in apparatus of the type comprising a series of widely separated signal transmitters connected to a central signal receiving station, for example, to apparatus such as a circuit including a plurality of fire alarm boxes or similar signal transmitters connected to a central signal receiving station. The invention particularly affords improvements in "successive non-interfering" signal transmitters as commonly employed for such purposes.

Apparatus of the class to which this invention relates is depended upon to avoid serious property loss and even in many cases loss of life itself; accordingly, it is a primary object of the present invention to afford an especially dependable signaling apparatus and particularly to provide a device of this character which is operable under a wider variety of adverse conditions than has been the case with any device of the general character which has been heretofore provided. Particularly the present invention provides a signaling device adapted to transmit signals over an emergency line or common return, such as a ground, if the regular circuit becomes faulty, while avoiding the closing of such an emergency circuit when the normal operating circuit remains properly conditioned. This invention also affords a signaling device arranged to operate when serially associated with similar devices without interference between such devices even if they are simultaneously or substantially simultaneously actuated. Thus the present invention affords an improved type of signaling device of the "perfect non-interfering" type, as well as a device having an improved emergency switch or ground wire return arrangement, and this invention particularly provides for the convenient association of both of these advantageous arrangements in a single signaling apparatus, thereby affording a wide range of utility and dependability, even under serious adverse conditions.

This invention may be utilized in connection with systems for fire alarm or signaling service in which the circuits comprise metallic loops serially routed through a considerable number of code signal transmitting call or alarm boxes, and in which, at a central point or station, the loop ends are connected through indicating or control devices to a suitable current source. Such current sources are generally referred to as "the central station battery" and may be normally free from ground connections so that the system may normally function as a full metallic or loop circuit. Such systems ordinarily include facilities for suitably associating a ground connection with the central station battery, which facilities may be made available, either manually or otherwise, whenever certain irregularities or faults may develop or threaten in the circuits or apparatus, so that intended signaling response at the central station may result from closing and breaking of a connection between one or the other or both portions of the signal circuit and the ground.

Signal formulating mechanisms constructed in accordance with this invention are, however, particularly suited for use in signaling systems of the general type contemplated by my Patent No. 2,018,656 dated Oct. 29, 1935.

This invention provides for automatically rendering facilities effective for emergency operation when malconditions of line circuit or other portions of the circuit appear, for example, such conditions as are usually referred to as "short circuits", "breaks" or the like. The emergency operation may ordinarily supersede regular working with the "perfect non-interfering and succession" signal transmitting mechanism in the event that the non-interference magnet or its associated parts become disabled. The function and purposes of this magnet and its related parts then being automatically dispensed with during emergency signaling operations. To permit these desirable results, test operations may be carried out in such a manner as to differentiate between a busy condition of the circuit and a malcondition thereof. Furthermore, should the testing operation indicate a malcondition of the circuit, the mechanism is so arranged that it will stop operation after the elapse of a comparatively short interval, thus conserving the energy stored within the motor spring and preventing needless exhaustion thereof, so that the motor may be ready to operate in response to a subsequent "pulling" of the box.

It is still another object of this invention, when the test operations shall point to a busy condition of the circuit, to provide that effects shall transpire progressively to limit the number of times a finally successful waiting or seeking box may repeat its signal. These restrictions vary inversely as the length of the preceding busy period: for a first length of busy period one repetition of a signal shall be deleted; after a slightly longer busy period two repetitions of the signal are deleted; proceeding in like manner, such effects may continue until a transmitter may send its signal but once, without any repetition; and, finally, should the length of the busy period extend beyond a second predetermined time limit, the mechanism of the waiting signal box abandons its attempts to seize the circuit and restores its mechanism to normal, while still retaining enough energy stored in its motor spring for carrying out any subsequent signaling as may be required in the regular eventuations of the service.

A further aspect of this invention relates to the arrangement of the mechanism so that the complete signal may ordinarily be transmitted, even when the current supply is abnormally low, if there is sufficient current to permit initial seizure of the line by the transmitter. Accordingly certain objections which have characterized previous mechanisms of this general type are avoided, since there is little possibility of the transmitter taking possession of the line and sending an incomplete or mutilated code signal, thus giving a false or wrong alarm indication.

More particularly objects of the invention are: To render the non-interference and succession mechanism ineffective in the event of failure of this mechanism to be influenced, by adequate energization of the electromagnet, for a time longer than the longest interval between magnet energizations which should occur incident to the formulation of any signal, to the end that the mechanism may act without the non-interference and succession functions to effect the formulation of the intended code signal notwithstanding any defect or disablement to which the non-interference magnet or its associated mechanism may be subjected; to short-circuit the winding of an electromagnet included in an intended signaling path in the event of the failure of such magnet to become effectively energized throughout a time longer than the longest intended non-energization interval incident to the formulation of any signal, to the end that in the event of rupture of the current path through any such magnet winding, the intended code signal may nevertheless be transmitted over the normal metallic circuit, irrespective of the effectiveness of any ground or emergency circuit connection; to provide an emergency common return or ground connection only following the expiration of a time measured by the running of the train during which the magnet remains deenergized, which time is longer than the longest intended non-energization period incident to the formulation of any signal, and, at the same time establish one or more of the other emergency conditions just referred to; to assure effective signal formulation in the normal current path, irrespective of effectiveness of any ground connections, notwithstanding any degree of impairment of the normal line current strength; to provide a non-interference and succession type of mechanism which will act, if short-circuited or shunted out, to effectively transmit the intended code signal between the normal line current path and an emergency common return current path or ground connection; to provide all of the foregoing results without in any wise impairing the so-called "perfect non-interference and succession" functions, as provided by the most highly developed transmitting mechanisms now known, so long as the normal signaling current path remains unimpaired; to effect conservation of the main spring or other driving power for the transmitter mechanism by provision of means whereby, if the mechanism is started at a time when the circuit is broken or otherwise disabled, the operation of the mechanism will be terminated after acting to attempt to transmit the intended signal for but a minimum number of times, while permitting action pursuant to the succession mechanism on a busy circuit until a number of attempts to transmit the signal have been made which is the maximum number consistent with the ultimate main-spring capacity, and thus to reduce to a practical minimum the likelihood of the mechanism being brought to rest after having been started on a busy circuit, without having caused effective response to its signal formulation.

In the drawings:

Figs. 17, 18 and 19 are front elevational views of a portion of the stop train mechanism and related parts, showing these parts under various operation conditions;

Fig. 20 is an isometric view of the master plate assembly; and

For the purpose of facilitating comprehension of this invention and illustrating a manner of applying the several improvements thereof to a type of mechanism with which those skilled in this art are familiar, the embodiment of this invention shown by the accompanying drawings and hereinafter described in detail is one utilizing portions of mechanism such as that of the successive non-interference signal box disclosed in United States Letters Patent to Frederick W. Cole, No. 1,244,587, issued October 30, 1917. Portions of such mechanism which are clearly illustrated and described in said Cole patent are not always herein described in detail, except in instances in which such elements particularly relate to parts of the mechanism more particularly representative of this invention.

Notwithstanding the disclosure of the application of this invention to mechanism such as that of said Cole patent for the reasons just explained, it should be understood that this invention may be practiced with forms of mechanism other than that herein shown and described in detail; and that various aspects and features of this invention may be utilized separately or in groups consisting of less than all thereof.

*Motor and signal train*

Figure 1:
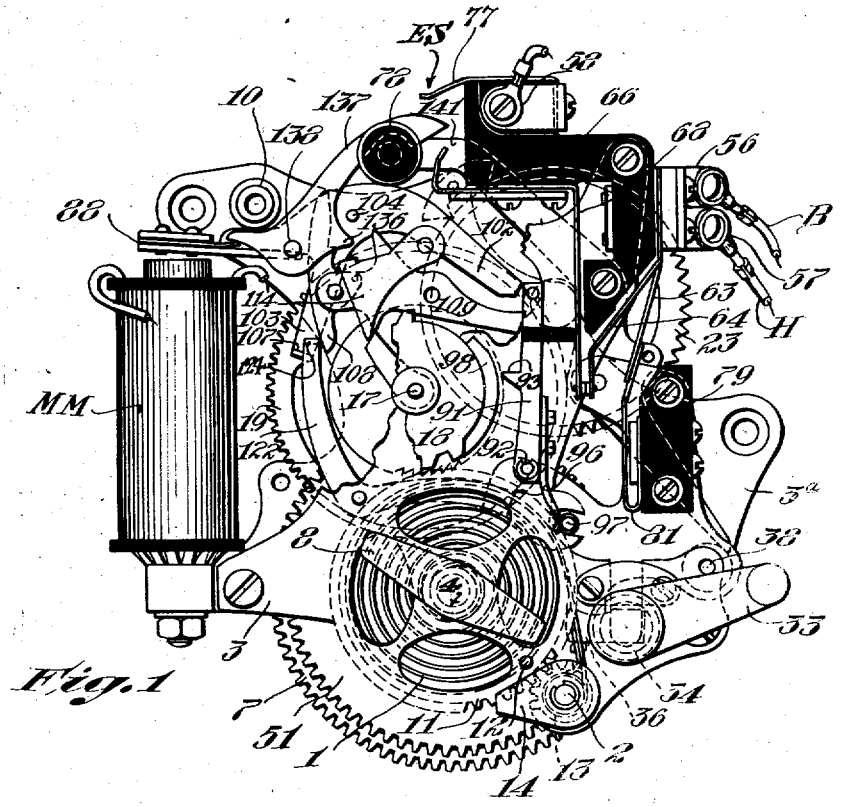
Fig. 1 is a front elevational view of improved transmitting apparatus constructed in accordance with the present invention, certain parts being broken away for clarity of illustration.
Figure 3:
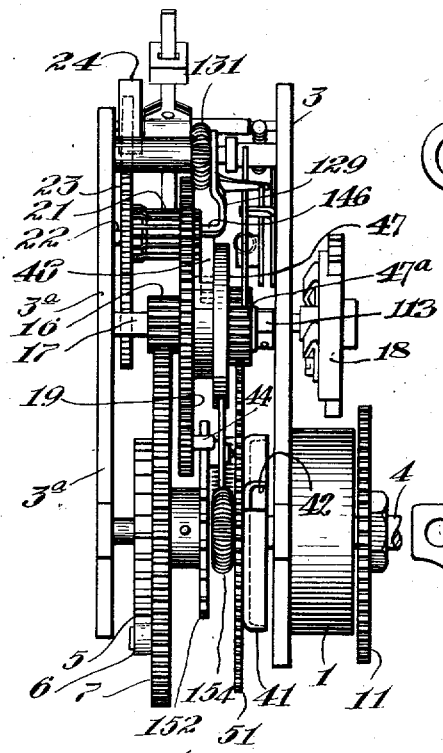
Fig. 3 is a side elevational view of a portion of the assembly shown in Fig. 1, certain parts being removed.

The motor means and a portion of the signal train may be similar to that disclosed in the above-identified prior Cole patent, as shown in Fig. 1, the outer end of main spring 1 is fixed to a stud 2 anchored to the outer frame plate 3 of the assembly, the inner end of this spring being attached to the main shaft 4 (Fig. 3). The ends of shaft 4 are journaled in front and rear plates 3 and 3ª, these plates being held in spaced relation by struts 10. The winding handle 8 may be turned counterclockwise, as viewed in Fig. 1, to wind the spring 1 to condition it for imparting a clockwise movement to shaft 4 when the spring is released. A gear 11 cooperates with a rotating pinion 13 and carries a stop pin 12 for engagement with an arm 14 moving with said pinion to prevent overwinding in the manner described in the above-identified patent.

Figure 6:
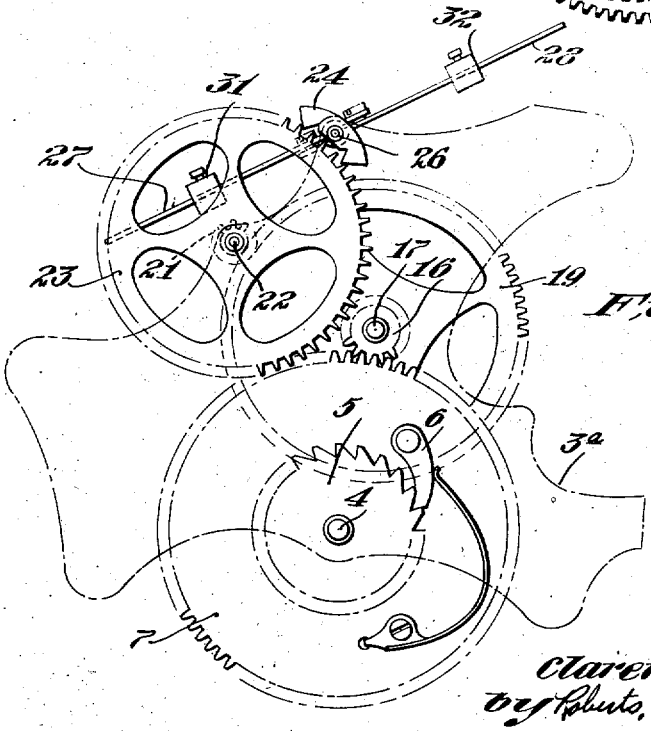
Fig. 6 is a rear elevational view of a portion of assembly, particularly showing a part of the signal train and the escapement mechanism associated therewith.

A ratchet wheel 5 secured to shaft 4 engages a spring-pressed pawl 6 that is pivotally mounted on a spur gear 7 free to rotate on shaft 4 (Fig. 6). The gear wheel 7 meshes with a relatively small pinion 16 on the shaft 17, which carries the signal wheel 18 (Figs. 1 and 3). A gear wheel 19 secured to shaft 17 meshes with a pinion 21 fixed to shaft 22 and to the escapement wheel 23. The latter engages a speed limiting pallet 24 (Fig. 6) mounted on a pivot 26, arms 27 and 28 extending from this pallet and bearing respective adjustable weights 31 and 32 to affect the speed of the signal train and thus control the speed of the signal wheel 18.

*Manual control*

Figure 5:
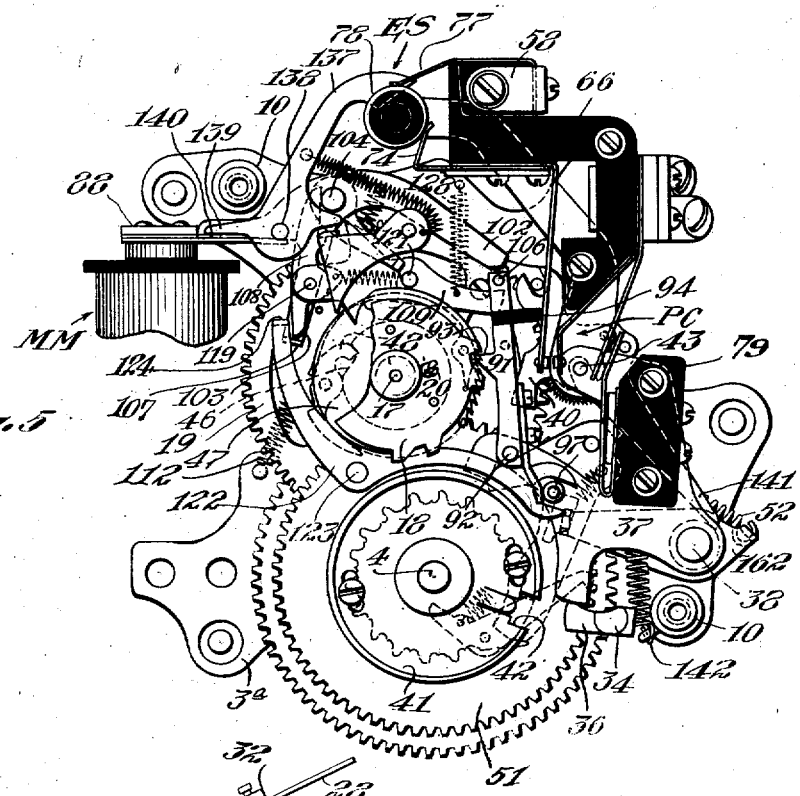
Fig. 5 is a front elevational view of a portion of the apparatus, parts being broken away and removed and the position of the remaining parts being that which they occupy during a signal transmitting period.

A lever 33 is disposed in front of the frame plate 3 and connected to a pivot shaft 34, the latter carrying a projection 36 which has a cam-like engagement with a rocking or master plate 37 to swing the latter clockwise (Figs. 1 and 5). Plate 37 is mounted on a pivot 38 (Fig. 20) that is rotatably mounted between the front and rear plates 3 and 3ª, while an arm 162 moves with said shaft 38 and has a hooked projection engaging the end of retractile spring 52, the opposite end of which is connected to a pin projecting from plate 3ª. Plate 37 is disposed directly behind plate 3 and has an extension affording a tracer arm 39 (Figs. 10 and 11), which may ride the dished periphery of or enter a notch 42 in a "rounds" measuring disk 41 that is rotatable on but independently of main shaft 4. A stop dog 40 has a pivotal connection 43 with the plate 37 and is simultaneously shiftable from engagement with the stop pin 44 projecting from gear wheel 19 when the tracer arm 39 is withdrawn from the notch 42, to permit the signal train to start operation under the action of main spring 1. When the arm 39 of the master plate moves into the notch 42 of the rounds measuring disk 41, the stop dog 40 is brought into the path of the pin 44 upon the wheel 19 to arrest and retain the mechanism in its inoperative position. When the notch 42 has moved out of registration with the arm 39, the tension spring 52 presses the end of said arm against the flanged periphery of the measuring disk 41, thus retaining the master plate in its operative or clockwise position and affording brake means for the disk to prevent overrunning thereof.

The stop dog 40 is substantially in the form of a bell crank and has an arm 40ª with a bifurcated end loosely engaging the escapement-wheel shaft 22. The dog also has a slotted bearing portion 40ᵇ engaging the pivot stud 43 that projects from plate 37, and cooperating with a coil spring 53 which is looped about a boss concentric with the pin 43. This arrangement affords a clearance between walls of the slot at the end of arm 40ª and the shaft 22 and permits the end of dog 40 to snap away from the pin 44 with a positive and rapid movement; thus preventing reengagement of the end of stop dog 40 with pin 44 and assuring positive release of the train irrespective of how quickly the pull handle is released after pulling.

The use of the stop pin 44 upon the gear 19 is particularly advantageous, since the strain from the spring 1 received by the pin, the dog 40 and the related parts is comparatively low due to the gear ratio between gears 7 and 16 and the shafts 4 and 17, respectively. Furthermore, stressing of the arm 39 in response to the normal compression or stress of spring 1 is avoided; accordingly the plate 37 may readily be moved to its clockwise or operative position, while the pivotal arrangement of the stop dog permits it readily to be snapped out of position, this movement being aided by the tendency of gear 19 and pin 44 to rotate under the influence of the main spring.

*Signal wheel assembly*

Figure 15:
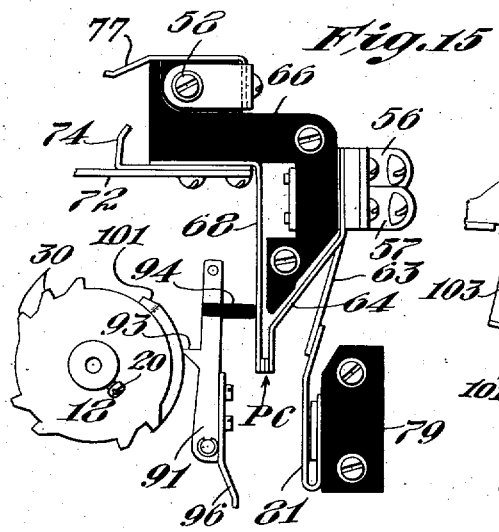
Figs. 15 and 16 are front elevational views of the signal wheel, sender arm and the related electrical contact and conductor assembly.
Figure 16:
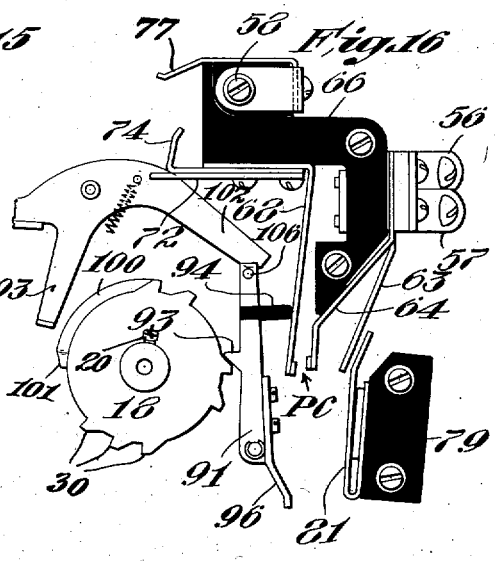

The signal wheel 18 may be detachably secured by a set screw 29 to the outer end of shaft 17, thus to permit ready interchangeability (Fig. 5), and is provided with a plurality of teeth 30 in accordance with the distinctive code signal that is to be sent from the individual box. The sender arm or automatic key 91 is pivotally mounted upon the front plate 3, as indicated by numeral 92, and is provided with a lug or fluke 93 (Figs. 15 and 16) which is engageable with the protuberances 30 on the signal wheel. An insulating block or abutment 94 secured to arm 91 engages the twin contact springs 67 and 68 (Fig. 2), thereby to set up pulsations in electrical current, as will presently be described, while these springs yieldably urge arm 91 toward wheel 18.

Figure 8:
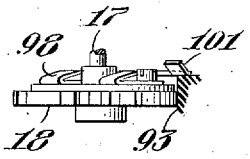
Figs. 8 and 9 are edge views of the same, showing the relationship of the wheel to a portion of the sender arm.
Figure 9:
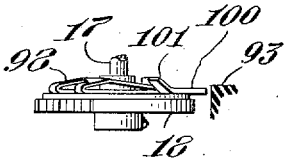

A member 96 depends from the lower end of the sender arm 91 and normally abuts a stud 97 (Fig. 1) projecting from master plate 37, so that the latter in its normal position holds the lever 91 and fluke 93 out of engagement with the signal wheel 18 while holding the abutment 94 against the stressed springs 67 and 68 of the pulsating contact assembly PC. A shield 98 is secured to the rear face of the signal wheel 18 (Figs. 1, 8 and 9). This shield is formed of resilient sheet metal, which is folded back upon itself so that one leg or planar portion thereof engages the rear face of wheel 18, while the opposite leg yieldably presses against the first leg, as well as providing a skirt 100 extending beyond a peripheral portion of the wheel 18. The end of this skirt has an advanced, inclined corner portion 101. When the master plate 37 initially moves out of its normal position to release the arm 91, the edge of skirt 100 engages the fluke 93 and holds the latter spaced from the periphery of the signal wheel 18, while the contacts of assembly PC remain in engagement under the action of their supporting springs. As shown, the wheel 18 is provided with a continuously curved, void or interdental space adjoining the skirt. After the wheel 18 is rotated so that the skirt 100 no longer is disposed adjoining the fluke 93, arm 91 may, under certain conditions, swing toward the wheel, so that, during subsequent revolutions, the lip or inclined corner 101 of the skirt may engage the fluke with a cam-like action, the shield thus being stressed and engaging the inner face rather than the edge of the fluke (Fig. 8), thus permitting said skirt 100 to be rotated past said fluke without thereby either lifting or supporting said arm 91.

*Electrical connections*

Figure 21:
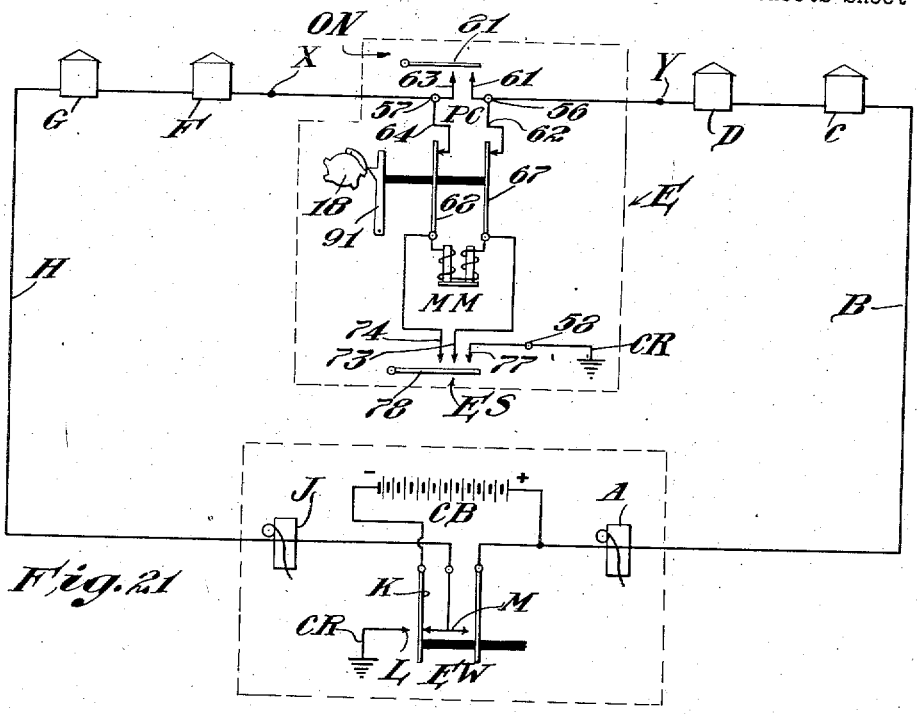
Figs. 21, 22 and 23 are typical wiring diagrams.
Figure 23:
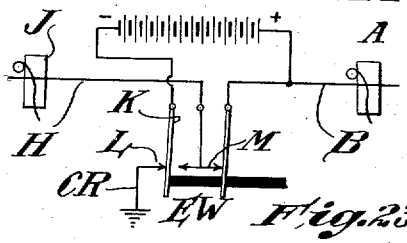

Referring first to the typical wiring diagram of Fig. 21, it is to be understood that a plurality of boxes or instruments C, D, E, F and G, such as disclosed and described herein, are arranged in series, the parts of the box E being shown diagrammatically. The boxes as thus connected, are jointed by main leads B and H to the respective sides of a central battery CB, the lead B operating a signal-responsive or recording device A at one side of the battery and the lead H similarly operating a device J. The emergency working switch EW, as shown in Figs. 21 and 23, has a contact K connecting the line section H with the left end or minus terminal of the battery; but is adjustable (Fig. 23) so that the ground connection or common return CR may be connected to this terminal of the battery by the engagement of elements L and K, while the conductors H and B are then connected through element M with the opposite battery terminal. The devices A and J may be capable of transferring signals received from the outlying boxes in any well-known or desired manner, as by visual, audible, recorded or any suitable combination of such forms of signal manifestation.

Figure 2:
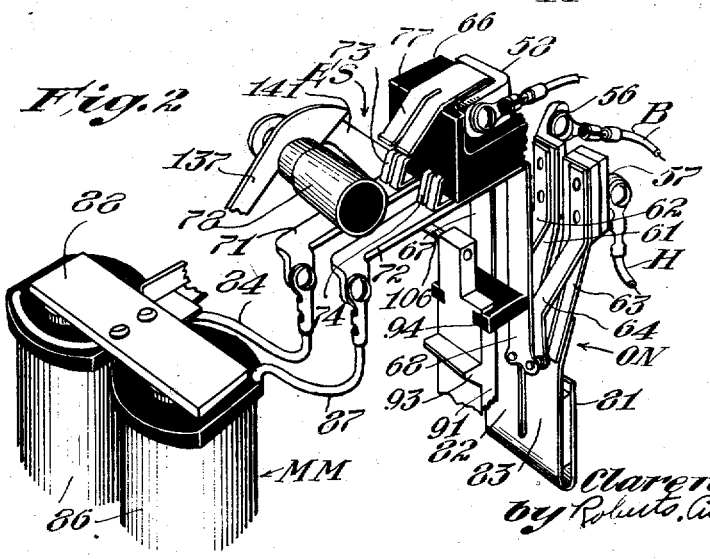
Fig. 2 is an isometric view of a portion of the assembly shown in Fig. 1, parts being broken away and removed to show clearly the arrangement of the electrical conducting elements and related parts.

Fig. 2 illustrates more particularly the connection of the external leads to the individual signal transmitting apparatus and also the arrangement of electrically conductive components of the apparatus. The terminal 56 may be connected to an exterior line section, such as the section B, while a similar terminal 57 is connected to the opposite line section, as the section H. A third line section or common return, such as a ground conductor, may be connected to the third terminal 58.

Terminals 56 and 57 include rectangular plate portions arranged to clamp respective double sets of contact springs 61 and 62; 63 and 64 against a block 66 of insulating material, which is secured to the front plate 3 of the assembly. Block 66 has a substantially right-angular form (Figs. 15 and 16), the contacts or terminals 56 and 57 being secured to the outer face of the depending leg of the angle, while the terminal 58 is secured to the upper part of the horizontal leg of this angle. Angular contact springs 67 and 68 are secured by terminal post bars 71 and 72 against the lower surface of this horizontal leg of the insulating angle 66. The springs 67 and 68 are arranged so that their depending legs, which follow arm 91 as previously described, also provide contacts normally engaging similar contacts at the lower ends of springs 62 and 64, respectively, (see Figs. 2 and 15), while the horizontal legs of springs 67 and 68 are turned up to provide contacts 73 and 74 of the emergency switch assembly, indicated generically by reference characters ES. A spring member 77 is clamped to the block 66 by the terminal member 58 to serve as a third contact element of the switch ES, Figs. 1 and 2.

Secured to the master plate 37, a block of insulating material 79 carries a return bent resilient member 81, the free end of which is bifurcated to form two contact springs 82 and 83, normally to engage the respective contact members 61 and 63. The member 81 forms a shunting conductor, and since it is movable with the master plate 37, it normally engages the contactors 61 and 63, thus joining the line terminals 56 and 57 and shunting out the circuits of the transmitter unit. In a converse manner, when the master plate 37 is rocked clockwise, the member 81 will be retracted from the line springs 61 and 63, thereby removing the shunt from the transmitter. This switch is commonly referred to as the "box-shunt", and as its actuation occurs only in the operation to effect an off-normal condition of the transmitter mechanism, it will be indicated by the appropriate functional reference characters ON.

On removal of the box shunt as just described, a path may be traced from line terminal 56 over the normally engaged contact springs 62 and 67, terminal post bar 71, conductor 84 to the two serially connected magnet coils 86, of a master magnet MM, thence over a conductor 87, terminal bar 72, and the other set of normally engaged contacts provided by springs 63 and 64, to the other line terminal 57. Thus, the first two line circuit sections may be joined, at certain times, through the magnet MM in completing a loop circuit, the current in which causes the magnet to attract its armature 89, and thereby initially condition the transmitter to operate in a standard or normal manner. The non-interference magnet MM serves divers major functions and is of universal utility in the present mechanism; accordingly, it may also be referred to by this functional term, master magnet.

*Sender arm control assembly*

Figure 11:
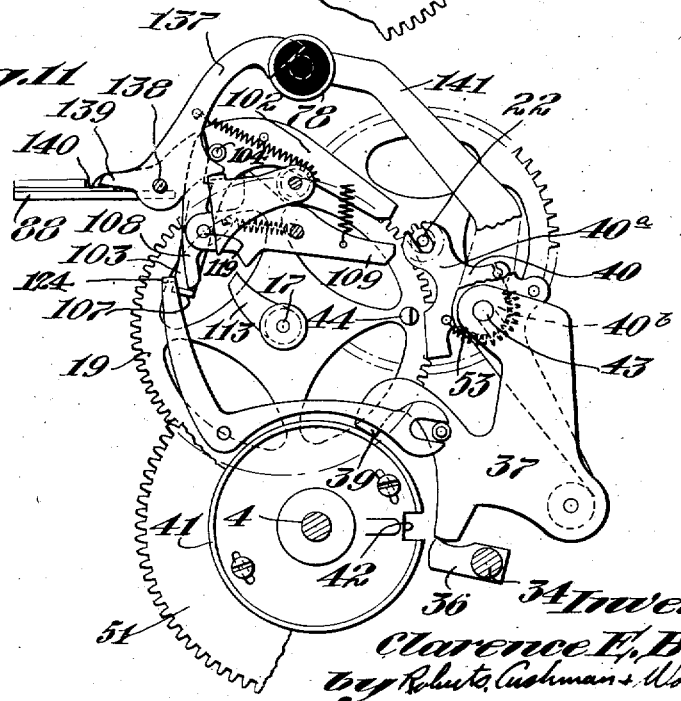
Figure 12:
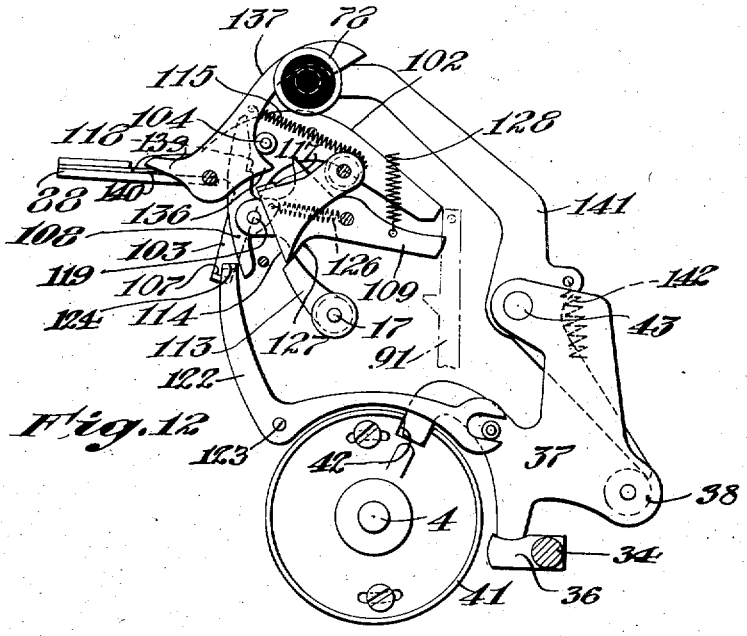
Figs. 12 and 13 are views similar to Figs. 10 and 11 respectively, but more particularly illustrating the arrangement of the sender arm control mechanism.

The armature 98 normally is drawn away from the magnet MM by a spring 112 and has integral levers 102 and 103 rocking about a pivot element 104 (Figs. 5 and 11), one of the struts 10 acting as a stop to limit the movement of the armature under the tension of spring 112 (Fig. 1). The lever 102 is movable into and out of the path of a guard pin 106 which extends rearwardly from the upper end of sender arm 91 and which has a flat surface adjoining the end of arm 102. The lower end of lever 103 provides an outturned ledge 107 movable into the path of a swinging pawl 108 pivoted at 119 (Fig. 13) on the left-hand end, as seen in Figs. 5, 11 and 12, of a latch member 109. When the current flowing to magnet MM is uninterrupted as the signal train starts operation, the ledge 107 is disposed below pawl 108 and the pawl may rest thereon, so that the right-hand end of the latch member is held beneath the path of guard pin 106, despite the tension of spring 128 connecting this end of the latch with the plate 3 (Figs. 5 and 12). Thus, when the armature is juxtaposed to magnet MM, the lever 102 is disposed above the path of the guard pin 106, while the end of latch 109 may be disposed beneath this point (Fig. 5). Accordingly the path of the pin may be cleared so that sender arm 91 can reciprocate.

The contacts provided by springs 62 and 64 remain in engagement with the sender contacts provided by springs 67 and 68 for an interval sufficiently long after the sender arm 91 has started its movement toward the left in beginning an impulse formulation, to permit the guard pin 106 upon arm 91 to pass beneath the right-hand end of lever 102 before separation of the contacts occurs. Accordingly, when these contacts separate and effect deenergization of magnet MM, the lower surface of lever 102 rides upon the upper surface of pin 106 through the remainder of the sender arm stroke towards the left and the return portion of this stroke (Fig. 16) until the contacts of switch PC have again moved into mutual engagement. Thereupon reenergization of magnet MM takes place so that the armature 88 is electrically retained in its portative position. While the armature 88 is thus continually held in its attracted position, the free end of the lever 102 is withdrawn from the path of guard pin 106, and if the latch 109 has previously been withdrawn from the path of said pin 106, it will be held out of such path by the engagement of the lower end of the pawl 108 with the ledge 107 carried by the arm 103. The sender arm will therefore be free to operate in response to rotation of the signal wheel 18 so long as the positions of the parts just referred to remain unchanged.

Figure 13:
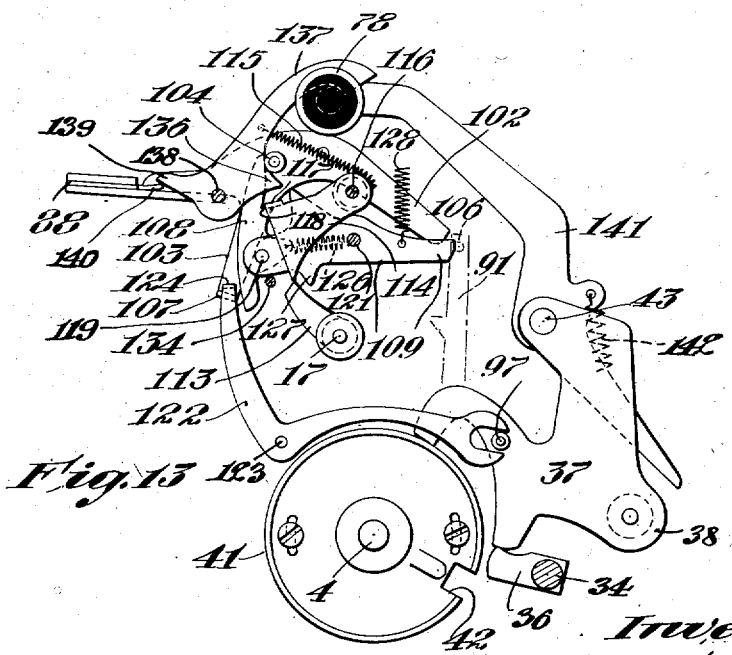

Normally the actuating cam 113 is at rest beneath the projection 127 of lever 109 to prop the latter against the tension of rotator spring 128 (Fig. 12). Slight advance only of the signaling train from normal is sufficient to move cam 113 beyond fluke 127, so that unless otherwise stayed (as by engagement of pawl 108 with ledge 107 when armature 88 is in its portative position), the member 109 may swing to its blocking position, where its right end is in the path of guard pin 106 and where it encounters the stop pin 134 fixed to the frame plate 3 (Fig. 13). In this position the left-hand end of member 109 supports the depending end of pawl 108 in the path of the intersecting extension 107 of lever 103, and also in the path of the angle 124 at the end of restoring lever 122. A pawl 114 pivoted at 116 on plate 3 is engageable by the cam 113 an instant after it starts rotation, so that when the latch lever 109 is in its blocking position the pawl is lifted and its projection 117 is seated or latched on a ledge 118 (Fig. 14) of the latch pawl 108, as shown in Fig. 13. The retractile spring 115 continually tends to swing pawl 114 counterclockwise on pivot 116, so that it tends to project into the path of the actuating cam 113, while the tension spring 126 connects an ear on member 108 with the pivot pin 121 that supports latch 109, thus yieldably swinging the upper portion of member 108 toward the projection 117 and toward or against a sleeve on armature pivot 104, which acts as a stop.

In order to permit the latching just described, the dual purpose stud 97 of the master plate 37 projects between the extremes of the bifurcated end of the latch restoring lever 122 (Figs. 5 and 13) pivoted to the frame plate 3 at 123 and serves, in the off-normal position of the plate 37, to rock the lever 122, swinging its upper or free end to the left, so that an angle 124 thereon may be withdrawn from its normal abutment against the lower end of the pawl member 108 (Figs. 1, 5, 12 and 13). This permits the spring 126 to swing the upper end of the member 108 to the right for latching the lifted switch pawl 114, as just described.

When the armature 88 is rocked on the pivot 104 due to momentary energization of magnet MM, the projection 107 of the lever 103 moves to the right against the depending end of the latch 108 to effect counterclockwise movement of the latter member, thereby withdrawing the latch-ledge 118 from the keeper 17 of the switch actuating pawl 114. This action completes the cycle of busy test operations for the first round of the signaling wheel 18, and in these operations the ground switch actuator 114 is lifted and latched in an intermediate position and subsequently released to return to normal position in preparation for meeting other than a busy condition on the line. Description of the latter effects will presently be continued. The unlatching of the switch actuator 114 at this time merely indicates that the only non-normal condition of the line circuit found to be present by the busy test operations was that of "busy line". All of the operations just described occur during a relatively short interval during the initial round of the signal train, and if the current flowing through terminals 56 and 57 is interrupted due to the operation of another transmitter, the locking lever or guard 109 remains in the path of the guard pin 106 to keep the sender arm 91 ineffective during the remainder of this first round.

The busy test operation just described will be repeated at the beginning of each round of the signal wheel 18, as the signaling train continues to run and constitutes successively repeated attempts of the present transmitter to seize the circuit for immediate use. At the end of each round, the cam 113, in passing under the tracer 127 of the sender lock 109, rocks the latter clockwise momentarily to remove the right-hand end of this member from the path of the guard pin 106, in presenting the sender arm 91 for possible control acceptance by the signal wheel 18. The completion of the round or cycle of the signal wheel occurs at a time when the shield 98 supports (as will be hereinafter more fully explained), on its edge, the tracer 93 of the arm 91 to prevent movement of said arm toward wheel 18, and since the first round was ineffective to "send" on account of the busy condition assumed to having been encountered, the lever 109 continues to prop the sender arm 91 in its ineffective position until entire completion of the round. At the latter instant, the shield 98 is again in the position in which it is shown in Fig. 1, where its skirt 100 supports arm 91 while lever 109 is being withdrawn from the path of the guard pin 106. Therefore, under the continuing operation of the signaling train and at the beginning of the second round of the signal wheel 18, the various parts concerned in the testing operations will be in the same positions in which they were at the beginning of the first or initial round.

The edge of shield 100 has a slightly eccentric contour at 101, so that the advance portion thereof may engage the fluke 93 with a cam-like action, moving the pin 106 slightly to the right out of engagement with latch 109, so that the latter may freely move under the action of cam 113 to its non-blocking position. The pin 106 and arm 91 may occupy any one of five positions: first, the normal position wherein pin 97 engages tailpiece 96 and the fluke 93 is slightly spaced from shield 98 (Fig. 1); second, the position wherein the fluke 93 rides on the edge of the shield (Fig. 15); third, the position wherein the pin 106 engages the end of arm 109 (Fig. 13); fourth, the position wherein the fluke engages the top of a tooth of wheel 18; and, fifth, the position wherein the fluke engages an interdental surface of wheel 18. In the first four positions the contacts of assembly PC may remain closed; in the last position the contacts are separated.

*Ground switch control*

When the armature arm 102 and the latch 109 are disposed in the path of pin 106 due to the armature being in its raised position, the cam 113 may engage the projection 127 and thus rock the member 109 clockwise. The upper surface of the projection 117 of switch actuator 114, if it has remained in its lifted and latched position on the ledge 118 of member 108, will then be elevated to its actuating position against the lower edge of a projection 136 on a switch latch lever 137 pivotally mounted on frame plates 3 and 3ª, as indicated by numeral 138 (Fig. 11). The elevation of the left-hand end of member 109 then thrusts the extension 117 against projection 136 to rock lever 137 counterclockwise. Thus, the switch actuator 114 is lifted in two steps, the first resulting in the latching on ledge 118 (from which it is dislodged if magnet MM is momentarily energized to swing part 107 against pawl 108), the second step occurring after substantially one revolution of cam 113 following the first step and involving the engagement of the cam 113 with the fluke of latch 109 while the member 114 is supported by ledge 118. Accordingly, the movement of actuator 114 to rock lever 137 will only occur if the magnet MM has remained deenergized during substantially one revolution of the shaft 17. The upper end of lever 137 is curved to provide a keeper for retaining cylindrical contactor or switch member 78 in its ineffective position, as shown in Fig. 12. The counterclockwise movement of lever 137 accordingly releases contactor 78 and a projection 139 on the lever engages a protuberance 140 from the armature 88, mechanically rocking the armature into its portative position (Figs. 5 and 11).

The contactor 78 is secured to the end of a lever 141, a tensile spring 142 tending to move this lever clockwise about the pivot 43 carried on master plate 37 (Fig. 5) to thrust contactor 78 into engagement with contact springs 73, 74 and 77, thereby providing an electrical shunt for the magnet and joining the springs 67 and 68 of the switch assembly PC, while connecting the ground terminal 58 with these contacts. When plate 37 is in its normal position, pivot 43 is so positioned that the end of lever 141 is carried into engagement with shaft 38, to thereby maintain contactor 78 away from contacts 73, 74 and 77, and in position to freely permit lever 137 to move into latching position in the path thereof, so long as plate 37 is in normal position. The free end of lever 137 has an inclined end engaging the contactor 78, such end being so formed that during movement of the arm 141 responsive to spring 142, as the contactor 78 passes along said inclined surface it will cause the arm 137 to swing somewhat in a counterclockwise direction and thereby act through the extension 139 moving with said lever 137 and the flexible strip 140 associated with the armature 88, to firmly hold said armature and its associated assembly in portative position and, at the same time, to stabilize contactor 78 in engagement with the contact springs 73, 74 and 77. While the armature assembly is thus maintained in its portative position, the ledge 107 carried by the lever 103 is disposed in the path of the lower end of the pawl 108 and thereby prevents the descent of the latch lever 109 at times when the support of the cam 113 is withdrawn from the projection 127 of said latch lever; with the result that neither the free end of said latch lever 109 nor that of the arm 102 will be disposed in the path of the pin 106, and the arm 91 will be free to move in response to the rotation of the signal wheel.

*Stop train and related control mechanism*

Figure 14:
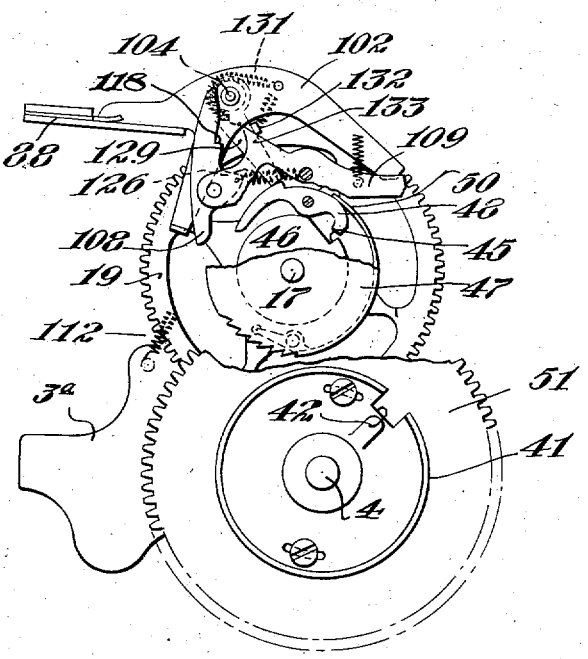
Fig. 14 is an elevational view of certain parts of the apparatus with parts broken away and removed to show particularly the arrangement of a portion of the sender arm control mechanism and a portion of the stop train.

A pawl cam 46 fixed to signal gear shaft 17 has a notch 45 engageable with a pawl 48 that is pivotally mounted on a rotatable member 47 in loose assembly with the shaft 17 (Figs. 5 and 14). A spring 50 engages the pawl 48 and thus tends to retain the opposite end of the latter in engagement with the recess 45, to hold the clutch in its closed or operative position, so that the members 46 and 47 may be caused to rotate as a unit with the signal wheel shaft 17 and the members fixed thereto. Member 47 carries a gear 47ª which meshes with a wheel 51 affixed to the measuring disk 41 upon the main shaft 4 (Fig. 3). When the clutch 46—48 is closed, the signal and stop trains operate together to bring the rounds disk 41 to its normal position so that spring 52 (Figs. 5 and 10) will rock plate 37, and cause arm 39 to reengage the notch 42, and the stop dog 40 to engage the stop pin 44.

The signal and stop trains preferably have such a gear ratio that the measuring disk 41 normally makes one revolution during four revolutions of the signal wheel 18. Under certain conditions, however, the clutch 46—48 is open so that the signal train continues in motion while the movement of the stop train is interrupted. Accordingly the signal wheel may continue rotating and tests of the circuit conditions may be made through the armature and latch mechanism, while the rounds or measuring disk 41 remains stationary at one point of its path.

Figure 4:
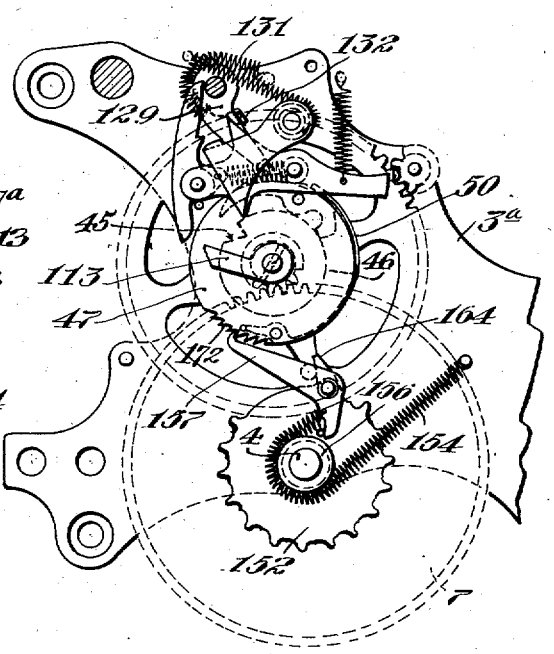
Fig. 4 is a front elevational view of certain portions of the signaling apparatus, including portions of the stop train and sender arm control mechanism in non-signaling position.
Figure 7:
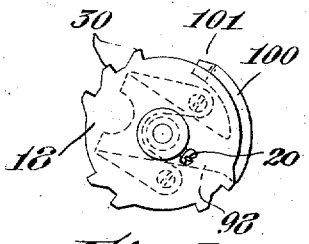
Fig. 7 is a front elevational view of the signal wheel.

A skipping dog 129 (Figs. 4 and 14) loosely swung on the pivot shaft 104 is continuously stressed clockwise by a rotor spring 131 extending from the dog about a boss concentric with shaft 104 and having its remote end connected to a pin upon the armature lever 102. An arm 132 projects forwardly from dog 129 to engage a sloping extension or fluke 133 on the upper edge of the left-hand end of latch lever 109, so that the lower extremity of dog 129 may swing downwardly to engage the pawl 48 when the right-hand extremity of the latch lever is raised to its blocking position. Accordingly, the lower end of the skipping dog 129 is then disposed in the path of the pawl 48 so that it may engage the pawl after the shaft 17 has made substantially one revolution, thus to disconnect the clutch elements 46 and 48 and cause cessation of movement of the members 47, 47ª upon the shaft 17, and of the measuring disk 41 and its gear 51 upon the main shaft 4, the end of stop arm 39 engaging the dished periphery of the measuring disk under these conditions to act as a brake and prevent accidental forward movement of the same as the clutch is held out.

A counting movement is provided which prevents continued rotation of the signal wheel without effect upon the rounds disk, so that, if line conditions prevent transmittal of the signal after a plurality of rounds of the signal wheel, the mechanism may be automatically stopped to prevent entire exhaustion of the potential energy normally stored in the main spring. For this purpose, the stepping and stop pin 44 upon gear 19 may engage ratchet teeth on a counting wheel 152 that is loosely mounted on main shaft 4, advancing this wheel one step (Fig. 17) under the control of a click element 153 and against the tension of a spring 154 which is adapted to be wound on a grooved hub 156 on the counting wheel. Spring 154 is secured to the element 153 and to a stepping pawl 157 pivoted to ratchet wheel 152 at 158, this spring serving the triple purpose of drawing the ratchet wheel to its normal position, yieldingly retaining the pawl 157 against a stop pin 159 on the side of the ratchet wheel and stressing the holding pawl or click element 153 clockwise against counting ratchet 152. Element 153 is stepped to provide two ledges which, together with the end of the pawl, afford three different surfaces which at respective times may engage teeth of the counting wheel 152. The element 153 is pivotally mounted on a pin 155 projecting forwardly from plate 3a, this pin also engaging the end of the retractile spring 52 for plate 37.

An aperture 161 in the body of the pawl 153 receives the angled extremity 163 of the arm 162, which is secured to pivot shaft 38 of master plate 37. Normally, when the latter plate is rocked counterclockwise, the angle 163 is disposed adjoining the apex of the opening 161, thereby holding the free end of pawl 153 out of the path of a long tooth 164, on the counting wheel 152, while the intermediate ledge or shoulder 166 of the pawl is positioned to engage this tooth 164, in retaining the counting ratchet 152 in its normal or zero position (Fig. 19). Conversely, when the mechanism is off normal, the plate 37 standing clockwise, the angle 163 of the arm 162 is positioned toward the larger end of the opening 161 in the holding pawl 153, thereby substantially freeing this pawl for additional movement to the left so that it may freely engage the teeth of the counting ratchet wheel 152, under tension of the universal retractile spring 154.

Although substantially any desired time or rounds-relation capacity may be afforded by this allotting means, for purposes of illustration, a certain numerical relationship and capacity has been assumed and illustrated in the drawings.

From the normal position in which the allotting means as well as the other mechanism is shown in Fig. 19, the first round of the signaling train may cause the pin 44, in passing counterclockwise, to engage the twelfth tooth, as may be numbered clockwise from and including the long tooth 164 of the counting ratchet 152, thus advancing the latter clockwise one step, so that it will then be retained by engagement of the end of the pawl 153 with the long tooth 164. During the second round of the mechanism, the pin 44 engages the next lower or eleventh tooth of the counting ratchet 152 in advancing it a second step, whereupon it is retained by engagement of its last tooth 169 with the last ledge 167 of the holding pawl 153, while on the third step of the ratchet wheel 152 during the third round of the signal train, and also during the following successive advancing steps thereof, both of the shoulders 166 and 167 of the holding pawl incidentally may dually engage teeth in retaining the counting wheel as advanced (Fig. 18).

The presence of the interdental or gap-space intermediate the extended tooth 164 and the last tooth 169 on the counting wheel 152 is the principal reason for providing the intermediate shoulder 166 which serves to hold the counting wheel in its normal or zero position and also to cooperate in holding it on succeeding steps, as just described.

During the first eleven rounds, for example, the counting wheel 152 is advanced the distance of one tooth per step, but during the twelfth round the pin 44 engages the extended tooth 164. This ensures ample forward throw and also sufficient rotary sweep of the stepping pawl 157 during the twelfth round to permit it to seize one of the teeth in a tooth-field 172 on the periphery of the pinion disk 47, and thus rock this disk a limited distance counterclockwise as a preliminary step, presently to be augmented during subsequent revolutions of the wheel 19 by other steps whereby the cam pawl 48, carried by this disk 47, may finally be withdrawn form beneath the angle 146 at the end of the trip dog 129, thus permitting said pawl to move responsive to its spring 50 so that it will be engaged by the disk 46 (see Fig. 14) and thereby effect further rotation of the wheel 51 for the purpose of advancing the disk 41 toward the position in which its notch 42 will be presented in the path of the tracer 39.

The interdental space between the long tooth 164 and the last tooth 169 on the counting wheel 152 provides that during each round, subsequent to the twelfth round, the action effected by the pin 44 will be restricted to engagement with this long tooth only, and the positions and proportions are such that, while the wheel 152 may be affected, it will not be moved a full step. Therefore, during the latter rounds, the wheel 152 divides its function as a counting means with the disk 47, and also becomes an intermediate link in a train of mechanism for intermittently connecting the pin 44 to the stepping pawl 157. Thus, under such condition each time the pin 44 sweeps past the tooth 164 it causes the wheel 152 to "rock", and thereby "rake" the attendant stepping pawl 157 forward in the tooth-field 172 of the disk 47, thereby to seize and drag the latter disk forward a certain distance, either in preparation for or in conclusion of a series of actuations for clearing the trigger end of the pawl 48 from the trip dog 129. As the forward "rock" of the wheel 152 is less than a full step, the holding pawl 153 may not "fall in" but merely ride the point of the next ratchet tooth of this wheel, sought to be presented thereto. Therefore, on the instant the pin 44 passes from the long tooth 164 and thus releases the then unlatched wheel 152, the spring 154 will cause "backlash" movement until it is checked by the holding pawl 153 meeting the tooth of the ratchet on which it was previously seated. During such retraction of the wheel 152, the stepping pawl 157 is moved backward in preparation for a new "hold" in the toothfield 172 of the disk 47.

Under the conditions just assumed and described the pin 44 engages the long tooth 164 of wheel 152 and advances the counting wheel to its highest or final point against the action of retractile spring 154. Thereupon during the twelfth and succeeding rounds of the mechanism the stepping pawl 157 may be effective in advancing the disk 47 notch by notch. Thus the disk 47 is advanced two successive notches during the twelfth and thirteenth rounds, this movement being sufficient to withdraw the pawl 48 from the skipping dog 129 so that the clutch 46—48 is reengaged, causing the member 47 and gear 47a to rotate with the shaft 17 and causing a quarter revolution of the rounds disk 41. Thereupon if the current conditions are such that the skipping dog 129 remains in the same position, the dog again engages the pawl 48, the clutch 46—48 is opened, and for two successive additional rounds the member 47 is stepped along by engagement of the stepping pawl 157 with the toothed portion thereof. At the end of the second succeeding round the skipping dog and pawl are again disengaged, the clutch 46—48 is again closed, and the measuring disk makes another quarter turn. The same sequence of operations may be repeated at the end of two more rounds so that the measuring disk 41 completes its final quarter revolution, whereupon the arm 39 reenters the notch 42, thus causing the dog 40 to be carried into the path of the pin 44 to thereby terminate the operation of the mechanism.

Whenever the mechanism is brought to rest under any of the various circumstances herein described through the stop dog 40 being moved into the path of the pin 44, the accompanying clockwise movement of the plate 37 in carrying the arm 39 into the notch 42, correspondingly swings the arm 162 so as to change the relationship between the angled extremity 163 of said arm and the aperture 161 in the body of the pawl 153, from that shown in Fig. 18 to that shown in Fig. 19, and thereby causes said pawl 153 to swing away from the ratchet 152. Said ratchet will thereupon be rotated counterclockwise, by its spring 154, until it is restored to its normal position where its long tooth 164 engages the intermediate tooth 166 of said pawl 153.

It is evident that the signaling apparatus may transmit three rounds of the signal through the pulsating contact assembly PC, if the rounds measuring disk has been moved one-quarter of a revolution before transmittal of signals through this assembly is permitted. If the rounds wheel or disk has moved one-half a revolution before the transmitter receives possession of the line, two rounds of the signal will be transmitted, and if the disk has moved three-quarters of a revolution, only one round will be transmitted. Accordingly, this arrangement results in the repetition of the signal for a smaller number of times after a determined period of delay, the number of repetitions being reduced as the period of delay is prolonged until but a single round of the signal may be transmitted, and ultimately the mechanism may be conditioned so that the signal will not be sent at all, but the signal train will stop to conserve some of the potential energy stored in the main spring 1 for a subsequent operation.

*Ordinary operation*

If the starting lever 33 is pulled, when the line circuit is in normal condition and no other transmitter associated with that circuit is in operation, the apparatus will operate in the normal manner to cause immediate transmittal of the signal. Pulling of the handle 33 swings the master plate 37 in a clockwise direction, removing the stop arm 39 from the notch 42 in the rounds disk 41 and snapping the stop dog 40 out of the path of the stop and stepping pin 44 on gear 16 (Fig. 11). Movement of the plate 37 also disengages the contacts of switch ON and removes the pin 97 from the tailpiece 96 of the sending arm 93, as well as swinging the angle 124 at the end of latch restoring lever 122 to the left, away from the depending end of pawl 108. As soon as the stop dog 40 is removed from the pin 44, and the arm 39 is retracted from notch 41, the signal train starts turning, due to the release of energy from main spring 1. The shunt connection provided by member 81 with its contacts 82 and 83 is disconnected by opening the switch ON so that current flows through the contacts of the pulsating contact assembly PC, the arms 71, 72, and the connections 84 and 87, whereby magnet MM is energized. Armature 88 is thus immediately drawn to its portative position, the fluke 93 of sender arm 91 having been moved into engagement with the skirt 100 by the springs 87 and 88 as soon as its tailpiece was released from engagement with the pin 97. The energization of magnet MM raises the arm 102 so that the guard pin 106 may pass under the end of this arm. When the shaft 17 starts rotating from its normal position, the cam 113 moves out of supporting engagement with the fluke 127 carried by latch lever or guard 109, so that the lower end of pawl 108 may engage the ledge 107 of armature lever 103, which has been moved by energization of magnet MM into the proper position to receive the lower end of the pawl. Thus the right-hand end of arm 109 is locked in its depressed position.

Accordingly the path of guard pin 106 is cleared, the latching lever being held below its path, and the energization of the armature holding the arm 102 above its path. As soon as the fluke 93 leaves the skirt 100, it may engage the periphery of the signal wheel, opening the contacts of switch assembly PC so that the magnet is no longer energized. However, under these conditions, the armature 88 is mechanically held in its portative position, due to the end of lever 102 resting on pin 106. As one of the teeth 30 moves the arm 91 to its switch closing position, the contacts of assembly PC are again momentarily closed to energize the magnet MM to permit the armature to be electrically retained in portative position before its mechanical support provided by the parts 102 and 106 becomes inoperative. Thus the electric pulsations are sent over the line or electrical loop provided by conductors B and H, so that the signal devices A and J in the main station may be energized to indicate and/or record the signal being transmitted.

Figure 10:
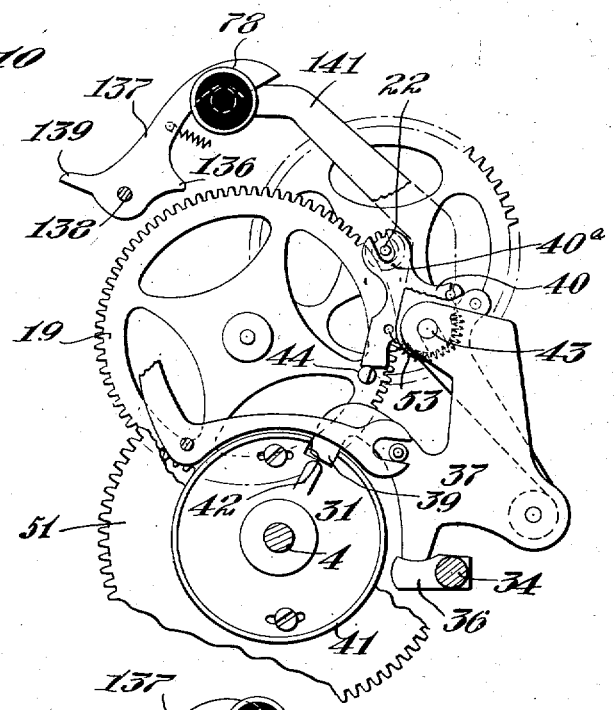
Figs. 10 and 11 are elevational views of certain parts of the apparatus, showing the position of the same when the signal train is stopped and when it is operating, respectively.

The skipping dog 129 is held out of the path of pawl 48, due to the position of latch lever 109, so that the clutch 46—48 remains in its closed condition. Accordingly the gear 47a rotates with shaft 17, so that the rounds disk makes one revolution in four revolutions of the shaft 17 and the signal wheel. Accordingly four rounds of the signal are transmitted before the notch 42 again receives the stop arm 39, thus permitting the plate 37 to return to its normal position and to move the stop dog 40 into engagement with the pin 44 (Fig. 10). Simultaneously the shunt switch ON is closed, the stud 97 reengages tailpiece 96, and the projection 124 at the end of arm 122 swings against the lower portion of pawl 108 positively to return the latter to its inoperative position.

Due to the ratio of gears 7 and 16, the shaft 17 of the signal wheel 18 may move through the four revolutions or rounds while the main shaft 4 is moving but a fraction of a revolution, for example, substantially one-half a revolution, so that the spring 1 has a sufficient capacity to send many signal rounds under ordinary conditions. In this connection it is to be noted that the measuring disk 41 and its gear 51 normally rotate faster than the shaft 4 upon which they are loosely mounted.

While the armature 88 may be drawn to its portative position, even if the line current is comparatively weak, it is evident that an even weaker current may be effective in holding the armature in portative position. Accordingly this apparatus is not likely, under weak current conditions, to obtain possession of the line and then transmit an incomplete or mutilated signal, but if the current is sufficient to effect line seizure, the armature will not be caused to move to retracted position, as a result of impaired line current strength during signaling impulses, unless the extent of such impairment is far greater than that in effect at the time of the commencement of the transmission of the signal.

*Operation when transmitters are in interfering relationship*

If the control lever 33 is pulled when the circuit is in possession of another transmitter, the switch ON is opened and the signal train, including the wheel 18, is set in operation in the same manner as described above. Similarly the ledge 124 of restoring lever 122 is moved away from pawl 108. Due to the possession of the line by another transmitter, there will be pulsations in the current passing over the line, so that circuit may be intermittently closed and the magnet MM intermittently and momentarily energized. The extent of the portion of wheel 18 adjoining skirt 100 is so related to the speed and spacing of teeth in the signal wheels of other transmitters that there is at least one momentary deenergization of the magnet MM while the fluke 93 is being supported by the edge of the skirt 100 if one of the other transmitters has prior possession of the line. Since the line is thus opened, however, the magnet MM does not remain energized and the armature 88 moves to retracted position, causing the arm 103 to carry the ledge 107 to a position where it no longer supports the lower end of pawl 108. The rotation of cam 113 permits the left-hand portion of arm 109 to drop and the right-hand end thereof to rise into its blocking position almost as soon as movement of the shaft 17 is initiated; thereupon the cam 113 engages the lower extremity of ground switch actuating dog 114, raising the latter to its intermediate position where the projection 117 thereon is lifted above the keeper ledge 118 carried by the pawl 108, which pawl then moves responsive to spring 126 to carry said ledge into the path of said projection 117 (assuming that the magnet MM is at this time denergized in response to an interruption of the circuit incident to the operation of another transmitter), thus performing the first step in the process of lifting the member 114 to its switch closing position. If the magnet MM is energized at the time when the switch actuating dog 114 is raised by the cam 113, as just described, the armature 88 will be in its portative position, so that the ledge 107 on the arm 103 will engage the lower end of pawl 108 and thereby prevent the ledge 118 from being carried by said pawl into the path of the angle 117 while the dog 114 is in its elevated position. If, however, the magnet MM is denergized at a time when the dog 114 is raised by the cam 113 as just described, upon the occurrence of further pulsations in the exterior circuit during continued rotation of the shaft 17, the armature 88 will be momentarily drawn to its portative position, and the ledge 107 on arm 103 moving with said armature will strike the lower end of pawl 108 and thereby swing said pawl so as to disengage its ledge 118 from the angle 117 of member 114, which member will thereupon return to its previous normal position. Thereafter, when the cam 113 next engages the member 114, the latter will merely repeat the first step of its movement.

During the beginning of each successive round of the signal wheel when the transmitter is prevented from seizing possession of the line, due to the prior possession thereof by another or other transmitters, the latch lever 109 is momentarily engaged by the cam 113, so that its right-hand end (Fig. 12) is moved downwardly against the tension of spring 128 to permit the pin 106 and sender arm 91 to move to the left unless otherwise prevented. At such times, however, the fluke 93 engages the edge of skirt 100, thus preventing such a movement of the arm and pin. If, however, the transmitter which has had possession of the line relinquishes the same, the magnet MM becomes permanently energized, the arm 102 being held above the pin 106; thereafter when the cam 113 next engages the fluke 93 and guard 109, it will depress the blocking extremity of the latter, and the lower end of the pawl 108 is engaged with the ledge 107 to retain the latch lever in its non-blocking position. This operation takes place while the edge of the skirt 100 engages the fluke 93. Thereupon the fluke may leave the skirt so that it engages the teeth elements 30 of the wheel 18 in the normal manner.

As described above, the operation of the signal train may continue if the line is busy due to possession by other transmitters, or if pulsations in current similar to "busy" signals cause momentary energization of magnet MM. For example, the shaft 17 and wheel 18 may rotate for as many as twenty-three turns before the stop train and counting mechanism have been effective in causing the disk 41 to turn through one revolution, so that the apparatus is stopped by a reengagement of the arm 39 with notch 42 and the dog 49 with pin 44. After the signal wheel has thus been rotating in an idle manner, without transmitting signals by means of the reciprocation of sender 91 and opening and closing of the contacts of assembly PC, the number of signal rounds which may be sent by the transmitter is automatically reduced.

Thus, as described above, after one or substantially one revolution of the shaft 17, the pawl 48 may engage the skipping dog 129, which is held in the path of the pawl due to the latch-lever 109 being in its blocking position. When the pawl 48 is thus engaged, the clutch 46—48 is opened and member 47 with its pinion 47a, the gear 51 meshed therewith, and the rounds disk 41 may remain stationary, although the signal train continues its movement. However, each rotation of the gear 19 causes the pin 44 to engage a tooth upon the periphery of counting ratchet wheel 152 (Fig. 17), thus to cause the gradual movement of the latter against the action of retractile spring 154, holding pawl 153 acting as a ratchet to retain the wheel 152 in its advanced position. Thus the counting mechanism may be effective to cause the counting wheel 152 to advance step by step or tooth by tooth, without any other definite result for a number of rounds of the signal train, as long as the line is busy. If at any time during this period the line should become clear, the armature is moved by energization of the magnet MM to such position that the ledge 107 will be disposed in the path of the lower end of pawl 108, to be engaged by said pawl to thereby support latch arm 109 in its elevated position after said arm has thereafter been next raised by the action of cam 113, so that the right-hand end of said arm will be moved downwardly to a position where it will no longer be disposed in the path of pin 106 and restraint of movement of the arm 91 will be terminated. Such movement of said arm 109 will also carry the sloping extension or fluke 133 moving therewith into engagement with the arm 132 carried by the skipping dog 129, and thereby move the free end of said dog out of the path of the pawl 48, so that the clutch 46—48 may then be closed, whereupon the mechanism will operate in the normal manner. Inasmuch as the occurrence just described takes place when the notch 45 in the disk 46 has just passed beyond the free end of the pawl 48, the closing of the clutch 46—48 will not become effective until the signal wheel 18 has thereafter completed nearly a full revolution, and has thus sent a round of the signal. After this, but three additional rounds will be sent from the transmitter, since the disk 41 had already made a quarter of a revolution at the time the skipping dog 129 was positioned to permit closing of the clutch 46—48, and since no more than one round is sent out to each quarter revolution of the disk.

If the line should still remain busy, the counting ratchet wheel 152 will continue its tooth-by-tooth movement until the long tooth 164 is engageable with the pin 44, which throws the hooked or raking ratchet 152 into engagement with the toothed field 172 on the disk 47 (Figs. 4 and 18), thus to cause a movement of the member 47, the parts being so proportioned that the wheel 152 is advanced less than a movement corresponding to a single one of its ordinary teeth, so that the ratchet element 153 permits a slight backward movement of the wheel 152 under the action of spring 154. In the course of the next revolution of the wheel 19 the pin 44 engages the long tooth 164, causing the hooked ratchet 157 again to engage the toothed field 172, thus moving the disk 47 far enough to disengage the pawl 48 from the skipping dog 129, permitting clutch 46—48 to close, so that when the notch 45 is next presented to the free end of said pawl 48 near the conclusion of the next revolution of the gear 19, the member 47 with its gear 47a will be caused to rotate for one revolution, thus turning the measuring disk 41 for a quarter of a revolution. Thereafter, if the line is released so that it may be taken possession of by the transmitter, but two rounds may be sent by the signal wheel after the notch 45 is presented to the free end of said pawl 48, since the measuring disk has made one-half a revolution. If, however, the line remains busy, the step-by-step movement of the disk 47 is repeated twice, due to engagement of the pawl 157 therewith, whereupon the clutch 46—48 is again closed and the disk 41 turns another quarter of a revolution, so that thereafter but a single signal round will be given if the line is released to the transmitter. After two more rounds, which result in another closing of the clutch 46—48, the shaft 17 enters its final round, the disk 41 passes through its final quarter revolution, and then the notch 42 is again presented to arm 39. The transmitter may gain possession of the line to send a signal until the cam 113 leaves the fluke 127 of arm 109 at the beginning of this final round, corresponding to the final quarter revolution of the disk 41.

The arrangement just described will also be effective to prevent interference between two transmitters should both transmitters be operated at the same time or, in effect, simultaneously. Under these conditions the sender contacts PC of both transmitters may at first operate in synchronism, as in any case of normal operation. If, for example, the two transmitters have signals presenting similar digits, when the initial teeth of the wheels 18 of the respective transmitters are withdrawn from their respective flukes 93, both transmitters may at first operate in synchronism. For example, assume that one transmitter sends signal pulsations according to the formula 2—3—5, and assume that the other transmitter sends a signal 2—2—5; both transmitters may operate together until the 2 of the second digit has been sent. Thereupon the line will be held open by the transmitter sending the signal 2—2—5, for a time longer than the interval between consecutive strokes of any numeral, so that the movement of the sender arm 91 of the other transmitter for effecting the third closure of its contacts for the second digit 3 will occur at a time when the circuit is open at the transmitter sending the signal 2—2—5. The armature of the 2—3—5 transmitter will be released from its magnet MM and the parts thereof will then occupy the position which normally is occupied under "line busy" signal conditions until the first transmitter has completed its signal. Thereupon the other transmitter may automatically seize possession of the line and send the signal for four complete rounds, or until its measuring disk 41 has made one revolution.

*Emergency operation*

When there is a break in the line circuit so that current may not be received by the magnet MM even momentarily, as would be the case where the line under a busy condition, the mechanism automatically operates to close an emergency line which normally may be in the form of a connection to a common return conductor, such as the ground. When the box is pulled under these conditions, the initial position of the parts may be the same as described above in connection with a busy test or when boxes are in interfering relation. The skirt 100 is disposed in blocking relationship to the fluke 93, thus preventing the movement of the arm 91 to a position where the contacts of assembly PC will open.

As the shaft 17 starts rotation, the cam 113 leaves the fluke 127 of the latch arm 109, permitting the latter to rock counterclockwise under the action of spring 128, so that the end of arm 109 is disposed in blocking relation to guard pin 106 to prevent movement of sender arm 91 when the skirt 100 passes out of engagement with the fluke 93 (Fig. 13). The cam 113 under these conditions is effective in lifting the ground switch actuator 114 to a position where the projection 117 thereof is latched over the ledge 118 upon the pawl 108, the projection 124 of restoring arm 122 and the projection 107 of armature lever 103 being positioned to permit the latching of members 114 and 108 in this manner as the shaft 17 starts rotation.

When the cam 113 has substantially completed one revolution, during which the clutch 46—48 has been disengaged, the skirt 100 is supporting fluke 93, the cam 113 engages the fluke 127 of the latch-lever 109, rocking the latter clockwise, so that the switch actuator 114, which is now supported in its intermediate or latch position (and which has not been dislodged from this position since the armature has remained retracted due to the absence of even a momentarily line current), will be lifted to a position where it engages the lever 137, lifting the latter against the tension spring 115 so that the switch arm 141 may swing about its pivot 43 to move contactor 78 into engagement with contacts 73, 74 and 77, thus closing the ground or emergency switch. The lifting of latch 109 also moves dog 129 away from pawl 48 (Fig. 4), so that clutch 46—48 is reengaged and rounds disk 41 starts rotating when the notch 45 has again been presented to the free end of said pawl 48.

Under these conditions the inclined end of member 137 has a cam-like engagement with the cylindrical support for the contactor 78, thus acting as a prop to hold armature 83 in its portative position (Fig. 11), the armature being moved and held by projection 139 on arm 137 engaging the armature spring 140. Further rotation of the cam 113 will thereupon withdraw it from engagement with the fluke 127, thus permitting the arm 109 to move responsive to the spring 128 until the lower end of the pawl 108 engages with the latch end 107 of lever 103; thus preventing movement of said lever to position where its free end would be disposed in the path of pin 106 and finally clearing the path of movement of said pin; the free end of armature lever 102 having been previously withdrawn from the path of said pin when the armature was moved to attracted position through the action of projection 139 moving with arm 137. Thus when the skirt 100 passes out of engagement with the fluke 93, the sender 91 is free to move to its circuit opening position and may oscillate in response to the contour of the wheel 18, intermittently closing the contacts of assembly PC in response to engagement with the teeth 30 distributed upon this wheel. Such movement of arm 109 caused its sloping extension 133 to act against the arm 132 carried by the skipping dog 129 to swing said dog to its inoperative position and thereby permit closure of the clutch 46—48, which closure becomes effective when the notch 45 is then next presented to the free end of the pawl 48 following substantially a revolution of the signal wheel 18, so that the rounds disk 41 will thereafter complete the final three-fourths of its revolution while the emergency switch ES is closed, and the contacts of assembly PC will act to formulate four signal rounds, the formulation of one of which will occur prior to the presentation of notch 45 to pawl 48 as just explained.

The emergency switching arrangement is effective to permit proper transmittal of the signal under many malconditions of the line, a few of which will be pointed out to show the general utility of this switching arrangement. For example, referring to Fig. 21, let it be assumed that there has been a line break at the point X in the left-hand line section H between the boxes E and F, the emergency switch ES having been closed in the manner just described and the switch EW at the central station having been thrown into its alternate position (see Fig. 23) to connect the third or ground line into the left-hand terminal of the battery CB while transferring the terminal of the line section H to the right-hand terminal of the battery. Under these conditions current may flow from the right-hand terminal of the battery through the lead B, conductors 62, 67, 73, 78, 77 and 56, to the common return or ground from which the current passes to the left-hand terminal or minus side of the battery. Accordingly as the switch PC is opened and closed, the signal pulsations from the transmitter E are effective in actuating the signal-responsive device A, the arrangement of the three-point emergency switch ES permitting the pulsing into whichever one of the two line connections may be closed, or, if both are closed, pulsing into them simultaneously. Obviously if the line break had occurred at point Y (Fig. 21) rather than at point X, the operation of the transmitter through its ground switch ES would be similar to that just described, the receiving device J rather than the device A being actuated.

As a further example of possible faulty circuit conditions, let it be assumed for convenience of description that a short circuit is due to the joinder of point X with point Y of the line section B and that it is desired to signal from the intermediate box E and, furthermore, that the switch EW has ben moved to its alternate position for emergency working (Fig. 23). When the switch ES closes under these conditions, one side of the line will be provided by the ground connection or common return CR, while the opposite line of the circuit loop will be provided by the conductors B and H in parallel.

If there is an open circuit, for example, at the left of point X on the line loop, and if the severed end of the line which extends to the right toward the box E has been grounded, the boxes C, D and E may perform to control the receiving device A in the ordinary manner, without actuation of their emergency switches ES; in other words, performing as if the circuit was completed through its normal path, except in that the resultant signal will be manifested only by receiving device A. The boxes at the other side of the break, namely, boxes F and G, however, will require the closing of their respective emergency switches ES to apply a ground connection, whereby the left-hand circuit may be closed and signaling effect may be manifested on the receiving device J. If, for example, there should be circuit openings at both the points X and Y, the box E would become isolated and in a hopeless condition. However, the remaining boxes G, F, D and C could still operate after their emergency or grounding switches had been automatically closed. Under these conditions, if an attempt is made to operate its box E, the emergency switch will be closed at the end of the first revolution of the signal wheel 18, and the movement of the arm 91 permitted during the four succeeding rounds of the signal wheel will not cause response of either instrument A or J. Since, however, the clutch 46—48 has remained closed, the rounds disk 41 rotates continually during the five revolutions of the shaft 17 and wheel 18, so that it is returned to a position where the notch 42 receives the stop arm 39 while the stop 40 simultaneously engages the pin 44. Accordingly under a hopeless circuit condition the rounds wheel will rotate but five times before the operation of the signal train and further exhaustion of the energy of the motor spring is interrupted. Thus the energy stored in the spring is conserved so that the box may be in a condition to transmit signals after the hopeless condition has been cured without necessitating rewinding of the motor.

Should the circuit be grounded either at X or at Y, while the central office switch EW is normally positioned, such grounding will not alter the responsiveness of devices A and J to signals from any of the boxes, even if of low resistance. If, during the effectiveness of such a low resistance ground of the external circuit, the central office switch EW is positioned as shown in Fig. 23, signals from boxes to the right of such ground connection will be responded to by device A and those from boxes to the left of such ground will be responded to by device J; so that, if such ground connection developed at X, device A would respond to boxes C, D and E and device J would respond to boxes F and G.

Should low resistance ground connections develop at two or more points, or should a low resistance ground connection develop at one point and a break occur at another point, signals from any box or boxes situated in the circuit between such defects would fail to cause response of either device A or J. For example, should the circuit be grounded at X and at Y or broken at X and grounded at Y, or vice versa, any one of such conditions would render the devices A and J unresponsive to box E, irrespective of the positioning of central office switch EW.

The arrangement of emergency switch ES permits shunting or excluding the magnet MM from the circuit so that a break in the magnet winding or in the immediate electric connections or the like does not prevent emergency working of the transmitter. Furthermore, this arrangement also is advantageous, since it requires relatively less current, since energization of the magnet is not required when working under emergency conditions, thus permitting operation with a weak current.

*Operation with optional circuit arrangement*

Figure 22:
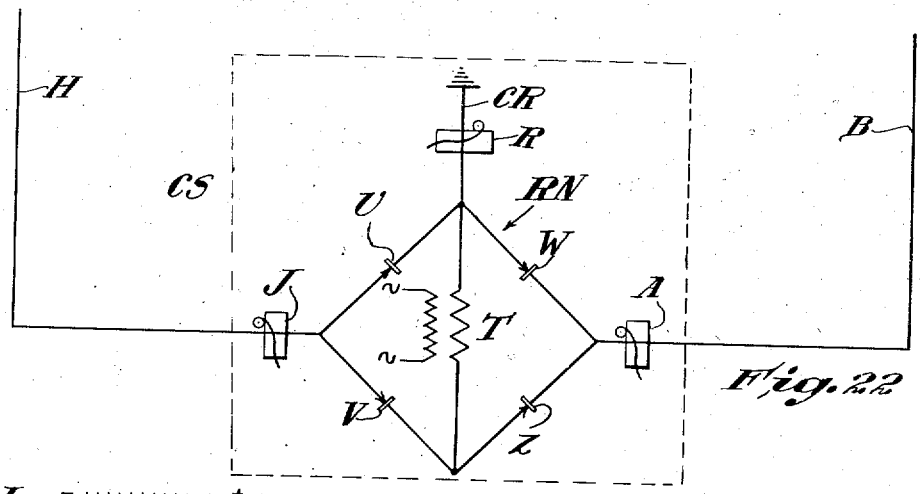

Fig. 22 shows a typical type of circuit which may be employed rather than that shown in Fig. 21, the differences in the circuits being in the arrangement of the central station portion CS. In the circuit arrangement shown in Fig. 22, which forms a portion of the subject matter of my copending application Serial No. 573,151, filed on even date herewith, the leads H and B correspond to those shown in Fig. 21 and may be connected to the signal boxes in exactly the same manner. The left-hand or primary winding of a transformer T may be connected to any suitable current source (not shown) which, for example, may be the commercial city lines, while the secondary winding of transformer T is connected across the input diagonal of a rectifier bridge or network RN. The latter comprises four rectifier units U, V, W and Z, so that one-half wave of a current cycle may cause the upper terminal of the secondary winding of transformer T to be positive and the current may flow through rectifier unit W, receiving device A, lead B, serially connected boxes C, D, E, F and G, lead H, receiving device J, and rectifier V to the lower terminal of the secondary winding. During the next half cycle the lower terminal winding of transformer T may be positive, so that the current may flow outward from rectifier unit Z, thence over the same loop to return over rectifier unit U. Thus each half-cycle of the alternating current supply may be rectified in the network RN to provide a unidirectional pulsating current for the line loop and the devices therein rather than the direct current source CB of Fig. 21.

The central station CS, when having an arrangement such as shown in Fig. 22, requires no special switching or circuit changes for emergency working. For example, it may be assumed that an opening in the line section H has occurred at a point X, such as shown in Fig. 21, and that subsequently the box E has been pulled. After one round of the signal wheel the emergency switch of the box is closed in the same manner as already described, so that during one-half cycle of the alternating current, current may flow from the lower terminal of transformer T through the rectifier unit Z, the serially connected device A, and stations in the line section B to the active signal initiating station, thence through the pulsing contact assembly PC of that station and its switch ES to the ground or return CR, whence the current will be received over the manifesting device R in the central station CS, thereupon passing to the upper terminal of the secondary winding of the transformer. During the next half cycle the direction of electromotive force will be such as to urge current flow toward the upper terminal of the transformer secondary winding T, from which parallel paths to the active station will be provided through manifesting device R and the ground or return CR, and through rectifier unit W, device A and line section B; but no return path will be provided from the active station to the lower terminal of the transformer secondary winding.

As another example of the emergency working of the arrangement shown in Fig. 22, in combination with boxes of the type disclosed herein, let it be assumed that the line loop sections B and H are connected by contact of points X and Y at either side of the transmitter E, thus short-circuiting this transmitter. Under these conditions when the upper terminal of the transformer T is positive, current may flow therefrom through the rectifier W, line section B into the line section H and thence return through the rectifier unit V to the opposite terminal of the transformer, while current may also flow through the device R, emergency conductor CR, switch ES of box E, and thence through conductor H and unit V. When the lower terminal of the transformer T is positive current may flow through the unit Z, the line section B, to the contacting point of X and Y, a portion of the current then flowing through the leads 62 and 64, the contact member 73 and 74, to the emergency switch ES and thence through the lead 77 to the common return CR from which the device R may receive the signals, the current then passing to the upper or negative terminal of the transformer. It is thus evident that under these conditions the signal device R will be actuated by alternating current impulses received from the signal box E.

Obviously the wiring diagram shown in Fig. 22 is but a typical example of a circuit arrangement which may be used advantageously with a signal box constructed in accordance with the present invention; in fact, it should be understood that the present disclosure is for the purpose of illustration only and that this invention includes all modifications and equivalents which fall within the scope of the appended claims.

I claim:

1. Signaling apparatus of the successive non-interference type comprising a first and a second pair of signaling contacts, three terminals, one of which is connected to a contact of one of said pairs and another of which is connected to a contact of the other of said pairs, an electromagnet connected between the remaining ones of the contacts of said pairs, non-interference and succession mechanism responsive to deenergization of said magnet during the intended signaling closure, sender means operative subject to control by said mechanism to effect the substantially simultaneous separation and engagement of the respective pairs of contacts, switching means subject to control by said magnet upon continuing deenergization thereof to connect said third terminal to the aforesaid remaining ones of the contacts of each of said pairs and thereby to shunt said electromagnet, and means operable incidental to continuing deenergization of said magnet for suspending such electromagnetic control of said non-interference and succession mechanism.

2. Signal apparatus of the successive non-interference type comprising a signal train, connections for a first, a second and a third line section, electro-responsive means disposed in electrically conductive relation between the connections for said first and second line sections, non-interference and succession mechanism responsive to deenergization of said electro-responsive means during an intended signaling closure, switching means operable to exclude said electro-responsive means while conductively grouping connections for said first, second and third line sections, controlling means operable responsive to continued deenergization of said electro-responsive means for effecting a certain predetermined conditioning of said switching means, and signal formulating mechanism operable by the signal train to formulate signals between said conductively grouped connections subject to control by said non-interference and succession mechanism only during non-effectiveness of said predetermined conditioning of said switching means.

3. A signaling transmitter of the class described, comprising a signaling train, terminals for connecting the train to a normally energized loop and for an emergency signal channel, an electromagnet responsive to malcondition of such loop as may be associated with said loop terminals, sender means operable by the running of the signaling train for causing electrical pulsations in such loop, emergency means for establishing cooperative relationship between said emergency terminal and one of said loop terminals, and means rendered effective by non-portative condition of said electromagnet to cause the signal train to render said emergency means effective to provide such cooperative relationship while shunting said electromagnet.

4. Signaling apparatus of the class described, comprising a normally energized signaling circuit, a signal wheel shaped to provide a test zone and a signal zone, a movable sender element to follow said signal wheel, an electromagnet connectible in series with said signaling circuit, a first guard means responsive to said magnet for at times barring movement of said sender element from a certain one to another of its positions, a second guard means movable to a position where it will bar movement of said sender means only while said first guard means is moving to or occupying the position in which it bars movement of said sender element, means rendering said second guard means thereafter unaffected by conditioning of said magnet to cause said first guard means to release said sender means, and a shield moving with said signal wheel to serve as a third guard means to bar operation of said sender means, said shield being shaped so that it will be ineffective during rotation of said wheel in the course of which said sender means has been permitted by said first and second guard means to respond to the signaling zone, whereby repetitions of a signal may be formulated unaffected by said shield.

5. Signaling apparatus of the class described, comprising a signaling train, a signal wheel, a signal sender operable by said wheel, stopping and releasing means associated with said train, a rounds wheel arranged to permit operation of said means to stop said train, clutch means between said signal train and said rounds wheel, an electromagnet and its armature, a guard movable into a position to suspend operation of said sender, control mechanism interacting with said armature, said guard and clutch means comprising means for causing suspension of the operability of the sender when the armature is out of portative position and for causing disengagement of the clutch means after one revolution of the signal wheel during which the armature has been out of portative position so that the rounds wheel may remain stationary, and allotting means thereafter effective to actuate and engage the clutch means following a certain number of revolutions of the signal wheel if said clutch means has continued to be disengaged due to the failure of the armature to assume a continued portative position, said control mechanism being operable after further movement of the rounds wheel again to disengage the clutch means, the allotting mechanism thereafter again causing engagement of said clutch means, whereby, if the sender is not permitted to operate after a certain number of rounds of the signal wheel, the rounds disk will be moved closer to its position for stopping the train, so that the number of revolutions the signal wheel may make to operate the sender is automatically reduced, if a prolonged period of time elapses before such sender operation.

6. Apparatus of the class described, comprising a signal train, a signal wheel revoluble by said train, a signal sender operable responsive to the rotation of said wheel, an electromagnet, a part responsive to said magnet and movable during non-portative conditioning thereof into a blocking position where it prevents functional actuation of the sender by the signal wheel, a latch associated with said part for movement, only during non-portative position of said part, to a position for correspondingly blocking funtional actuation of said sender, means for moving said latch to non-blocking position during each round of the signal wheel, means effective only during portative conditioning of said magnet for retaining said latch in non-blocking position while permitting continued blocking positioning during portative conditioning of said magnet, and a guard member rendered effective by running of said train to so position said sender as to clear the path of both said part and said latch and thereby also continue prevention of actuation of said sender, throughout such train effected non-blocking positioning of said latch.

7. Apparatus of the class described, comprising a signal train, a signal wheel revoluble by the train, a signal sender operable responsive to rotation of said wheel, an electromagnetically controlled mechanism comprising a latch movable at times to a blocking position for preventing functional actuation of the sender, in combination with stopping and releasing mechanism controlling operation of said signal train and involving a round disk movable toward a position for effecting termination of train operation, a clutch whereby said disk may be driven a predetermined distance by said train during each recurrence of a predetermined cycle of the action thereof, means responsive to blocking positioning of said latch to effect disconnection of said disk from the driving action of said train for delaying such termination of train activity, and means periodically operable by the train to effect alternate closures and openings of said clutch at predetermined stages of the continued operation of the train, to effect supplemental delay of the ultimate positioning of the disk to cause termination of train operation.

8. Apparatus of the class described, comprising a signal train, a signal wheel revoluble by the train, a signal sender operable responsive to rotation of said wheel for controlling a plurality of current paths, an electromagnet, a part responsive to said magnet and movable during deenergization thereof into a blocking position where it prevents functional actuation of said sender by said wheel, a latch urged toward a blocking position where it will retain said sender out of the path of said part and thereby also prevent functional actuation of said sender by said wheel, means for moving said latch to non-blocking position during each revolution of the signal wheel, means responsive to said magnet for retaining said latch in non-blocking position, an emergency switch for governing the responsiveness of one of said paths to said signal sender, controlling mechanism for said switch including a member responsive to said latch moving means for intermediate positioning thereof, and means for there retaining such member and for thereafter moving it to effect actuation of said switch responsive to subsequent movement of the latch by said latch moving means.

9. Apparatus of the class described, comprising a signal train, a signal wheel revoluble by the train, a signal sender operable responsive to rotation of said wheel for controlling a plurality of current paths, an electromagnet, a part responsive to said magnet and movable during deenergization thereof into a blocking position where it prevents functional actuation of said sender by said wheel, a latch urged toward a blocking position where it will retain said sender out of the path of said part and thereby also prevent functional actuation of said sender by said wheel, means for moving said latch to non-blocking position during each revolution of the signal wheel, an emergency switch for governing the responsiveness of one of said paths to the signal sender, controlling mechanism for said switch including a member responsive to said latch moving means for intermediate positioning thereof, means for there retaining such member and for thereafter moving it to effect actuation of said switch responsive to subsequent movement of the latch by said latch moving means, and means responsive to portative conditioning of said magnet for terminating such retaining action by said retaining means and rendering said member unresponsive to said latch.

10. Apparatus of the class described, comprising a signal train, a signal wheel revoluble by the train, a signal sender operable responsive to rotation of said wheel for controlling a plurality of current paths, an electromagnet, a part responsive to said magnet and movable during deenergization thereof into a blocking position where it prevents functional actuation of said sender by said wheel, a latch urged toward a blocking position where it will retain said sender out of the path of said part and thereby also prevent functional actuation of said sender by said wheel, means for moving said latch to non-blocking position during each revolution of the signal wheel, an emergency switch urged toward abnormal positioning thereof, said switch being effective to govern the responsiveness of one of said paths to said signal sender, a retainer for preventing movement of said switch from its normal position, a member responsive to said latch moving means for intermediate positioning thereof and movable to an abnormal position for causing said retainer to release said switch, and means for retaining said member in its intermediate position and thereafter moving it to effect the release of said switch from said retainer responsive to a subsequent movement of the latch by said latch moving means.

11. Apparatus of the class described, comprising a signal train, a signal wheel revoluble by the train, a signal sender operable responsive to rotation of said wheel for controlling a plurality of current paths, an electromagnet, a part responsive to said magnet and movable during deenergization thereof into a blocking position where it prevents functional actuation of said sender by said wheel, a latch urged toward a blocking position where it will retain said sender out of the path of said part and thereby also prevent functional actuation of said sender by said wheel, means for moving said latch to non-blocking position during each revolution of the signal wheel, an emergency switch urged toward abnormal positioning thereof, said switch being effective to govern the responsiveness of one of said paths to said signal sender, a retainer for preventing movement of said switch from its normal position, a member responsive to said latch moving means for intermediate positioning thereof and movable to an abnormal position for causing said retainer to release said switch, means for retaining said member in its intermediate position and thereafter moving it to effect the release of said switch from said retainer responsive to a subsequent movement of the latch by said latch moving means, and means for effecting non-blocking positioning of said part responsive to release positioning of said retainer.

12. Apparatus of the class described, comprising a current path, a revoluble signal wheel, a signal sender controlling said path and responsive to rotation of said wheel, a member electromagnetically controlled responsive to current flow in said path, a latch urged toward a position to block movement of the sender, means responsive to rotation of said wheel for moving said latch to non-blocking position, and a pawl pivoted on said latch for engaging said member only during portative positioning thereof to restrain movement of said latch from the non-blocking position.

13. Apparatus of the class described, comprising a plurality of current paths, a revoluble signal wheel, a signal sender responsive to rotation of said wheel and controlling each of said paths, a member electromagnetically controlled responsive to current flow in one of said paths, a latch urged toward a position to block movement of the sender, means responsive to rotation of said wheel for moving said latch to non-blocking position, a pawl pivoted on said latch for engaging said member only during portative positioning thereof to restrain movement of said latch from its non-blocking position, an emergency switch for governing functional association of certain of said paths, controlling mechanism for said switch including a member responsive to said latch moving means for intermediate positioning thereof, and means for there retaining such member and thereafter moving it to effect actuation of said switch responsive to a subsequent movement of the latch by said latch moving means.

14. Apparatus of the class described, comprising a plurality of current paths, a revoluble signal wheel, a signal sender controlling each of said paths and being responsive to rotation of said wheel, a movable latch urged toward a position where it will block movement of said sender, an electro-magnetically controlled member responsive to current flow in one of said paths for restraining movement of said latch to its blocking position, means responsive to rotation of and effective near the end of each round of said wheel for restoring said latch from its blocking position, an emergency switch for governing functional association of certain of said paths, controlling mechanism for said switch including a member movable between a normal, an intermediate and an operative position for effecting actuation of said switch, and means involving said latch and said responsive means for bringing said mechanism member to its intermediate position, for there maintaining it only during non-portative conditioning of said first-named member and for effecting movement of said mechanism member from its intermediate to its operative position only following continued non-portative positioning of said first-named member throughout substantially a round of the signal wheel.

15. Apparatus of the class described, comprising a current path, a revoluble signal wheel, a sender responsive to rotation of said wheel and controlling said path, and electromagnet responsive to current flow in said path, a lever movable to portative position responsive to energization of said magnet, a latch movable into a position to block movement of the sender, a pawl associated with the latch, said pawl being engageable with a part carried by said lever only during portative positioning thereof to hold the latch in non-blocking position, and a cam rotatable with the signal wheel to engage the latch to move it to non-blocking position during each revolution.

16. Signaling apparatus of the class described, comprising a signal train, a signal wheel, a signal sender movable into and out of operative position, the sender when in operative position being movable by the wheel, stopping and releasing means associated with the train, a rounds wheel arranged to permit operation of said means to stop the train, clutch means between the signal train and rounds wheel, an electromagnet and armature, a guard movable into a position to block movement of the sender into operative position, control mechanism interacting with the armature, the guard and clutch means to cause blocking of the sender when the armature is out of portative position and to cause disengagement of the clutch means after any revolution of the signal wheel during which the armature has been out of portative position, whereby actuation of the rounds wheel will be suspended, means for thereafter effecting reengagement of said clutch means after a certain number of revolutions of the signal wheel, during which said clutch means has continued to be disengaged due to the failure of the armature to assume a continued portative position, and means for effecting actuation of said control mechanism rendered effective responsive to further periods of movement of the rounds wheel to alternatively effect subsequent disengagement of the clutch means a plurality of times and to enable the reengaging means to cause reengagement of said clutch means after each of such disengagements, whereby, if the sender is not permitted to operate after a certain number of rounds of the signal wheel, movement of the rounds wheel closer to its position for stopping the train will be effected to the end that the number of revolutions the signal wheel is permitted to operate the sender will thereby be automatically reduced, resultant from prolongation of the time measured by the running of the train before commencement of such sender operation.

17. Signaling apparatus of the class described, comprising a signal train, a signal wheel, a signal sender movable into and out of operative position, the sender when in operative position being movable by the wheel, stopping and releasing means associated with the train, a rounds wheel arranged to permit operation of said means to stop the train, clutch means between the signal train and rounds wheel, said stopping and releasing means including a part yieldably pressing against the rounds wheel while the clutch means is thus disengaged to act as brake to hold the rounds wheel stationary, an electromagnet and armature, a guard movable into a position to block movement of the sender into operative position, control mechanism interacting with the armature, the guard and clutch means to cause blocking of the sender when the armature is out of portative position and to cause disengagement of the clutch means after any revolution of the signal wheel during which the armature has been out of portative position, whereby actuation of the rounds wheel will be suspended, allotting means for thereafter effecting reengagement of said clutch means after a certain number of revolutions of the signal wheel, during which said clutch means has continued to be disengaged due to the failure of the armature to assume a continued portative position, and means for effecting actuation of said control mechanism rendered effective responsive to further movement of the rounds wheel to alternatively effect subsequent disengagement and reengagement of said clutch means, whereby, if the sender is not permitted to operate after a certain number of rounds of the signal wheel, movement of the rounds wheel closer to its position for stopping the train will be effected to the end that the number of revolutions the signal wheel is permitted to operate the sender will thereby be automatically reduced, resultant from prolongation of the time measured by the running of the train which elapses before commencement of such sender operation.

18. Signaling apparatus of the class described, comprising a signal train, a signal wheel, a signal sender movable into and out of operative position, the sender when in operative position being movable by the wheel, stopping and releasing means associated with the train, a rounds wheel arranged to permit operation of said means to stop the train, clutch means between the signal train and rounds wheel, an electromagnet and armature, a guard movable into a position to block movement of the sender into operative position, control mechanism interacting with the armature, the guard and clutch means to cause blacking of the sender when the armature is out of portative position and to cause disengagement of the clutch means after any revolution of the signal wheel during which the armature has been out of portative position whereby actuation of the rounds wheel will be suspended, allotting means for thereafter effecting reengagement of said clutch means after a certain number of revolutions of the signal wheel, during which said clutch means has continued to be disengaged due to the failure of the armature to assume a continued portative position, and means for effecting actuation of said control mechanism rendered effective responsive to further movement of the rounds wheel to alternatively effect subsequent disengagement and reengagement of said clutch means, said alotting mechanism comprising a ratchet wheel having stepped movements in response to movement of the signal train, and a pawl carried by the ratchet being effective to release the clutch means after a predetermined number of said stepped movements, whereby, if the sender is not permitted to operate after a certain number of rounds of the signal wheel, movement of the rounds wheel closer to its position for stopping the train will be effected to the end that the number of revolutions the signal wheel is permitted to operate the sender will thereby be automatically reduced, resultant from prolongation of the time measured by the running of the train which elapses before commencement of such sender operation.

19. Apparatus of the class described, comprising a signal train, a signal wheel revoluble by said train, a signal sender engageable with the wheel and movable in response thereto, a magnet, contacts operable by said sender and connectively arranged to dispose the magnet serially in an electric line, an armature associated with the magnet, a part movable with the armature, a latch rocking on a fixed support intermediate its ends to bring an end thereof out of or into a blocking position where it prevents actuation of the sender by the signal wheel, a spring urging movement of said latch into its blocking position, a pawl pivoted to the opposite end of the latch and formed for engagement thereof by said part to cause the opposite end of said latch to be held out of blocking position when the armature is in its portative position, and a cam movable with said train to effect non-blocking positioning of said latch during each round of the signal wheel, said signal wheel providing a guard portion to hold said sender during the movement of the latch by the cam, whereby at the beginning of each revolution of the signal wheel the latch is movable to non-blocking position to be held in that position by said part if the armature is in its portative position.

20. Apparatus of the class described, comprising a signal train, a signal wheel revoluble by said train, a signal sender engageable with the wheel and movable in response thereto, a magnet, contacts operable by said sender and connectively arranged to dispose the magnet serially in an electric line, an armature associated with the magnet, a part movable with the armature, a latch rocking on a fixed support intermediate its ends to bring an end thereof out of or into a blocking position where it prevents actuation of the sender by the signal wheel, a spring urging movement of said latch into its blocking position, a pawl pivoted to the opposite end of the latch and formed for engagement thereof by said part to cause the opposite end of said latch to be held out of blocking position when the armature is in its portative position, a cam movable with said train to effect non-blocking positioning of said latch during each round of the signal wheel, said signal wheel providing a guard portion to hold said sender during the movement of the latch by the cam, whereby at the beginning of each revolution of the signal wheel the latch is movable to nonblocking position to be held in that position by said part if the armature is in its portative position, an emergency switch for rendering effective an alternative current path, and a switch actuator to close said switch, said actuator being movable by said cam into an intermediate position wherein it is supported by the pawl, said actuator being movable into switch closing position upon a subsequent movement of the latch by the cam, said actuator being releasable from its intermediate position by the engagement of the pawl with said part that is movable with the armature.

21. Apparatus of the class described, comprising a signal train, a signal wheel revoluble by said train, a signal sender engageable with the wheel and movable in response thereto, a magnet, contacts operable by said sender and connectively arranged to dispose the magnet serially in an electric line, an armature associated with the magnet to govern the response of the sender to the rotation of said wheel, a part movable with the armature, a latch rocking on a fixed support intermediate its end to bring an end thereof out of or into a blocking position where it prevents actuation of the sender by the signal wheel, a spring urging movement of said latch into its blocking position, a pawl pivoted to the opposite end of the latch and formed for engagement thereof by said part to cause the opposite end of said latch to be held out of blocking position when the armature is in its portative position, a cam movable with said train to effect non-blocking positioning of said latch during each round of the signal wheel, said signal wheel providing a guard portion to hold said sender during the movement of the latch by the cam, whereby at the beginning of each revolution of the signal wheel the latch is movable to non-blocking position to be held in that position by said part if the armature is in its portative position, an emergency switch including a movable contactor urged toward a closing position for rendering effective an alternative current path, a retainer normally restraining the contactor from movement to switch-closing position, a switch actuator for effecting closure of said switch, said actuator being movable by said cam into an intermediate position wherein it is retained by said pawl, said actuator being movable into a position for effecting switch closure upon a subsequent movement of said latch by the cam, said actuator being releasable from its intermediate position responsive to actuation of the pawl by said part that is movable by the armature, and means operable incidental to switch closing movement of the contact for holding the armature in its portative position.

22. Apparatus of the class described, comprising a signal train, a signal wheel revoluble by said train, a signal sender engageable with the wheel and movable in response thereto, a magnet, contacts operable by said sender and connectively arranged to dispose the magnet serially in an electric line, an armature associated with the magnet, a part movable with the armature, a latch rocking on a fixed support intermediate its ends to bring an end thereof out of or into a blocking position where it prevents actuation of the sender by the signal wheel, a spring urging movement of said latch into its blocking position, a pawl pivoted to the opposite end of the latch and formed for engagement thereof by said part to cause the opposite end of said latch to be held out of blocking position when the armature is in its portative position, a cam movable with said train to effect non-blocking positioning of said latch during each round of the signal wheel, said signal wheel providing a guard portion to hold said sender during the movement of the latch by the cam, whereby at the beginning of each revolution of the signal wheel the latch is movable to non-blocking position to be held in that position by said part if the armature is in its portative position, a master plate movable to release and stop the signal train, and a restoring element movable in response to movement of the master plate, said restoring element being effective to move the pawl out of engagement with said part when the master plate returns to its normal inoperative position.

23. Signaling apparatus of the class described, comprising an electromagnet for inclusion in a signaling loop to indicate a malcondition thereof, switching means for shunting the magnet while providing a connection for associating such a loop with a normally independent conductor to realize a two-way circuit, a signal train and signal formulating mechanism for controlling both such loop and such two-way connection, means operable in response to movement of said signal train during continuing non-portative condition of said magnet to cause the aforesaid actuation of said switching means, and means associated with said switching means for mechanically counteracting non-portative conditioning of said magnet during establishment by said switching means of such two-way circuit connection.

24. Signal apparatus of the successive non-interference type comprising an electromagnet, a signaling train, signaling contacts operable responsive to the running of said train, means rendered effective only during deenergization of said magnet for suspending responsiveness of said contacts to said train, and means responsive to continued deenergization of said magnet for a time measured by running of said train for short-circuiting said magnet and rendering said contacts responsive to running of said train.

25. Apparatus of the class described, comprising a signal train, a signal wheel revoluble by the train, a signal sender operable responsive to rotation of said wheel, said sender being effective to control a plurality of current paths, an electromagnet, a part responsive to said magnet and movable during deenergization thereof into a blocking position where it prevents functional actuation of said sender by said wheel, a latch urged toward a blocking position where it will retain said sender out of the path of said part and thereby also prevent functional actuation of said sender by said wheel, means for moving said latch to non-blocking position during each revolution of the signal wheel, an emergency switch for governing functional association of certain of said paths, controlling mechanism for said switch including a member responsive to said latch moving means for intermediate positioning thereof, means for there retaining such member and thereafter moving it to effect actuation of said switch responsive to a subsequent movement of the latch by said latch moving means, and means responsive to abnormal positioning of said switch for effecting non-blocking positioning of said part.

26. A signal formulating device having a signaling train, a signal wheel and associated contacts for effecting formulation of a code signal during a predetermined cycle of the rotation of said wheel, a non-interference electromagnet and its armature, trap means responsive to retracted positioning of said armature for at times rendering said contacts unresponsive to rotation of said wheel, conditioning means having a normal and an abnormal position, means rendered effective by abnormal positioning of said conditioning means for short-circuiting the winding of said magnet, for maintaining said armature in attracted position irrespective of energization of its magnet and for establishing a connection between a conductor for an emergency current path and certain of said contacts, means jointly controlled by said armature and by the running of said train for effecting abnormal positioning of said conditioning means whenever said armature has remained in retracted position throughout one of said signal wheel cycles, and means responsive to normal positioning of said armature and operable by running of said train for restoring said conditioning means and terminating the operation of said train.

27. A signal formulating device having a signaling train, a signal wheel and associated contacts for effecting formulation of a code signal during a predetermined cycle of the rotation of said wheel, a non-interference electromagnet and its armature, trap means responsive to retracted positioning of said armature for at times rendering said contacts unresponsive to rotation of said wheel, conditioning means having a normal and an abnormal position, means rendered effective by abnormal positioning of said conditioning means for short-circuiting the winding of said magnet and for maintaining said armature in attracted position irrespective of energization of its magnet, means jointly controlled by said armature and by the running of said train for effecting abnormal positioning of said conditioning means whenever said armature has remained in retracted position throughout one of said signal wheel cycles, and means responsive to normal positioning of said armature and operable by running of said train for restoring said conditioning means and terminating the operation of said train.

28. A signal formulating device having a signaling train, a signal wheel and associated contacts for effecting formulation of a code signal during a predetermined cycle of the rotation of said wheel, a non-interference electromagnet and its armature, trap means responsive to retracted positioning of said armature for at times rendering said contacts unresponsive to rotation of said wheel, conditioning means having a normal and an abnormal position, means rendered effective by abnormal positioning of said conditioning means for short-circuiting the winding of said magnet, for rendering said trap means ineffective and for establishing a connection between a conductor for an emergency current path and certain of said contacts, means jointly controlled by said armature and by the running of said train for effecting abnormal positioning of said conditioning means whenever said armature has remained in retracted position throughout one of said signal wheel cycles, and means operable by running of said train for restoring said conditioning means and terminating the operation of said train.

29. A signal formulating device having a signaling train, a signal wheel and associated contacts for effecting formulation of a code signal during the predetermined cycle of the rotation of said wheel, a non-interference electromagnet and its armature, trap means responsive to retracted positioning of said armature for at times rendering said contacts unresponsive to rotation of said wheel, conditioning means having a normal and an abnormal position, means rendered effective by abnormal positioning of said conditioning means for restoring and maintaining said armature in attracted position irrespective of energization of its magnet and for establishing a connection between a conductor for an emergency current path and certain of said contacts, means jointly controlled by said armature and by the running of said train for effecting abnormal positioning of said conditioning means whenever said armature has remained in retracted position throughout one of said signal wheel cycles, and means responsive to normal attracted positioning of said armature and operable by running of said train for restoring said conditioning means and terminating the operation of said train.

30. A signal formulating device having a signaling train, a signal wheel and associated contacts for effecting formulation of a code signal during a predetermined cycle of the rotation of said wheel, a non-interference electromagnet and its armature, trap means responsive to retracted positioning of said armature for at times rendering said contacts unresponsive to rotation of said wheel, conditioning means having a normal and an abnormal position, means rendered effective by abnormal positioning of said conditioning means for short-circuiting the winding of said magnet and for rendering said trap means ineffective, means jointly controlled by said armature and by the running of said train for effecting abnormal positioning of said conditioning means whenever said armature has remained in retracted position throughout one of said signal wheel cycles, and means operable by running of said train for restoring said conditioning means and terminating the operation of said train.

31. A signal formulating device having a signaling train, a signal wheel and associated contacts for effecting formulation of a code signal during a predetermined cycle of the rotation of said wheel, a non-interference electro-magnet and its armature, trap means responsive to retracted positioning of said armature for at times rendering said contacts unresponsive to rotation of said wheel, conditioning means having a normal and an abnormal position, means rendered effective by abnormal positioning of said conditioning means for maintaining said armature in attracted position irrespective of energization of its magnet, means jointly controlled by said armature and by the running of said train for effecting abnormal positioning of said conditioning means whenever said armature has remained in retracted position throughout one of said signal wheel cycles, and means responsive to normal positioning of said armature and operable by running of said train for restoring said conditioning means and terminating the operation of said train.

32. In a code signal formulating mechanism, a signaling train, contacts operable by said train for formulating code signals, a non-interference electromagnet, trap means responsive to deenergization of said magnet for at times rendering said contacts inoperable by said train, conditioning means for short-circuiting the winding of said magnet, for rendering said trap means unresponsive to deenergization of said magnet and for establishing an emergency connection with certain of said contacts, means jointly controlled by said magnet and by running of said train for causing actuation of said conditioning means to effective position only after the expiration of a time measured by the running of said train and longer than the longest interval between circuit closures incident to the formulation of any signal during which time said magnet remains deenergized, and means for effecting restoration of said conditioning means only following the operation of said contacts for the formulation of the intended code signaling impulses.

33. In a code signal formulating mechanism, a signaling train, contacts operable by said train for formulating code signals, a non-interference electromagnet, trap means responsive to deenergization of said magnet for at times rendering said contacts inoperable by said train, conditioning means for rendering said trap means unresponsive to deenergization of said magnet and for establishing an emergency connection with certain of said contacts, means jointly controlled by said magnet and by running of said train for causing actuation of said conditioning means to effective position only when said magnet has remained deenergized throughout a predetermined cycle of the operation of said train, and means for effecting restoration of said conditioning means only following operation of said contacts for the formulation of intended code signaling impulses.

34. In a code signal formulating mechanism, a signaling train, contacts operable by said train for formulating code signals, a non-interference electromagnet, trap means responsive to deenergization of said magnet for at times rendering said contacts inoperable by said train, conditioning means for short-circuiting the winding of said magnet and for establishing an emergency connection with certain of said contacts, means jointly controlled by said magnet and by running of said train for causing actuation of said conditioning means to effective position only when said magnet has remained deenergized throughout a predetermined cycle of the operation of said train, and means for effecting restoration of said conditioning means only following operation of said contacts for the formulation of intended code signaling impulses.

35. In a code signal formulating mechanism, a signaling train, contacts operable by said train for formulating code signals, a non-interference electromagnet, trap means responsive to deenergization of said magnet for at times rendering said contacts inoperable by said train, conditioning means for rendering said trap means unresponsive to deenergization of said magnet, means jointly controlled by said magnet and by running of said train for causing effective actuation of said conditioning means to effective position only when said magnet has remained deenergized throughout a predetermined cycle of the operation of said train, and means for effecting restoration of said conditioning means only following operation of said contacts for the formulation of intended code signaling impulses.

36. Signal transmitter mechanism of the successive non-interference type comprising signal formulating mechanism having terminals for connecting the mechanism to a plurality of exterior circuit sections and involving electroresponsive means to determine a malcondition of certain of said circuit sections which may be associated with certain of said terminals, non-interference and succession mechanism responsive to deenergization of said electroresponsive means during an intended signaling closure, emergency switching means for causing the shunting of the electroresponsive means during an intended signaling closure while connectively grouping all of said terminals for emergency control by said signal formulating mechanism during such a malcondition, and control means operable incidental to continuing deenergization of said electroresponsive means for effecting operation of said switching means and for rendering said non-interference and succession mechanism ineffective.

37. Signaling apparatus of the successive non-interference type comprising a signaling train, contacts operable responsive to running of said train for controlling a plurality of current paths, an electromagnet for energization by current in one of such paths, non-interference and successive mechanism responsive to deenergization of said electromagnet during closure of said contacts, and means operable incidental to continuing deenergization of said electromagnet for a predetermined time measured by the running of said train for governing the control of another of said paths by said contacts, for shunting said electromagnet and for rendering said mechanism ineffective.

38. A signal formulating device having a train operable for a predetermined signal formulation cycle, contacts operable by said train for formulating a code signal, an electromagnet, and non-interference mechanism rendered effective responsive to deenergization of said magnet for causing suspension of effectiveness of response of said contacts to said train, in combination with means for rendering said mechanism ineffective throughout a signal formulating cycle of the operation of said train, notwithstanding continuous deenergization of the magnet throughout such cycle and only after deenergization of said magnet continued for a time measured by the running of said train and longer than the longest interval between circuit closures of any signal.

39. A signal formulating device having a train operable for a predetermined signal formulation cycle, contacts operable by said train for formulating a code signal, and non-interference mechanism including an electromagnet for governing the effectiveness of such contact operability, in combination with means for rendering the effectiveness of the operation of said contacts independent of said mechanism throughout a signal formulating cycle of the operation of said train, notwithstanding continuous deenergization of the magnet throughout such cycle and only after deenergization of said magnet has continued for a time measured by the running of said train and longer than the longest interval between circuit closures of any signal.

40. A signal formulating device having a train operable for a predetermined signal formulation cycle, contacts operable by said train for formulating a code signal, an electromagnet and its armature, and non-interference mechanism responsive to retracted positioning of said armature for causing suspension of effectiveness of response of said contacts to said train, in combination with means rendered effective by said train, responsive to deenergization of said magnet continued throughout a time measured by the running of said train and longer than the longest interval between the circuit closures of any signal, for causing attracted positioning of said armature throughout an ensuing signal formulating cycle of the operation of said train notwithstanding further continued deenergization of said magnet.

41. A signal formulating device having a signaling train, contacts operable by said train for formulating a code signal, non-interference mechanism including an electromagnet and its armature, controlling mechanism whereby operation of said train may be initiated and will be thereafter terminated only at the conclusion of a predetermined operating cycle throughout which said armature remains in attracted position, in combination with means rendered effective by said train responsive to retracted positioning of said armature continued throughout a time measured by the running of said train and longer than the longest interval between the circuit closures of any signal, for maintaining said armature in attracted position throughout operation for the aforesaid predetermined cycle.

42. A signal formulating device having a train operable for signal formulation, contacts operable by said train for formulating code signals, an electromagnet, and non-interference mechanism rendered effective during non-portative conditioning of said magnet for preventing signal formulation during running of said train, in combination with means for rendering said mechanism ineffective during running of said train for signal formulation, notwithstanding continuous non-portative conditioning of the magnet during such signal formulation and only after non-portative conditioning of said magnet for a time measured by the running of said train and longer than the longest interval between circuit closures of any signal.

43. A signal formulating device having a train operable for a predetermined signal formulation cycle, contacts operable by said train for formulating a code signal, an electromagnet, and a normally effective current path serially including said contacts and said magnet, in combination with switching means for establishing a current path inclusive of said contacts and exclusive of said electromagnet for diverting energy from a portion of said normally effective path into a normally ineffective current path, and means for rendering said switching means effective throughout a signal formulating cycle of the operation of said train only after said magnet has remained deenergized for a time measured by the running of said train and longer than the longest interval between circuit closures of any signal.

44. A signal formulating device having a signaling train, signal formulating contacts operable responsive to the running of said train, an electromagnet, non-interference mechanism rendered effective only during substantial deenergization of said magnet for preventing signal formulation by said contacts during running of said train, and means responsive to continuation of such deenergization for a time measured by the running of said train and longer than the longest interval between circuit closures of any signal for causing signal formulation operation of said contacts responsive to further running of said train and irrespective of further continued deenergization of the magnet.

45. A signal formulating device having a train operable for a predetermined signal formulation cycle, contacts operable by said train for formulating a code signal, an electromagnet, and non-interference mechanism responsive to deenergization of the magnet for preventing signal formulation by said contacts during running of the train, conditioning means having a normal and an abnormal position, means operated responsive to deenergization of the magnet continued for a time measured by the running of the train and longer than the longest interval between circuit closures of any signal for effecting abnormal positioning of said conditioning means, and means operated by abnormal positioning of the conditioning means for rendering the non-interference mechanism ineffective notwithstanding deenergization of said magnet throughout an ensuing signal formulation cycle of said train.

46. A signal formulating device having a train operable for a predetermined signal formulation cycle, contacts operable by said train for formulating a code signal, an electromagnet, and non-interference mechanism responsive to deenergization of the magnet for preventing signal formulation by said contacts during running of the train, conditioning means having a normal and an abnormal position, means operated responsive to deenergization of the magnet continued for a time measured by the running of the train and longer than the longest interval between circuit closures of any signal for effecting abnormal positioning of said conditioning means, and means operated by abnormal positioning of the conditioning means for causing signal formulation operation of said contacts responsive to further running of said train and irrespective of further continued deenergization of the magnet.

47. A signal formulating device having a train operable for a predetermined signal formulation cycle, contacts operable by said train for formulating a code signal, an electromagnet, and non-interference mechanism rendered effective responsive to deenergization of said magnet for causing suspension of effectiveness of response of said contacts to said train, in combination with means for rendering said mechanism ineffective throughout a signal formulating cycle of the operation of said train, and for establishing an emergency connection with certain of said contacts, nothwithstanding continuous deenergization of the magnet throughout such cycle and only after deenergization of said magnet continued for a time measured by the running of said train and longer than the longest interval between circuit closures of any signal.

48. A signal formulating device having a signaling train, signal formulating contacts operable responsive to the running of said train, an electromagnet, non-interference mechanism rendered effective only during substantial deenergization of said magnet for preventing signal formulation by said contacts during running of said train, and means responsive to continuation of such deenergization for a time measured by the running of said train and longer than the longest interval between circuit closures of any signal for causing signal formulation operation of said contacts responsive to further running of said train and for establishing an emergency connection with certain of said contacts, irrespective of further continued deenergization of the magnet.

C. E. BEACH.